United States Patent
Wang et al.

(10) Patent No.: US 12,098,074 B1
(45) Date of Patent: Sep. 24, 2024

(54) SYSTEMS AND METHODS OF MAKING CARBON NANOTUBES

(71) Applicant: University of Maryland, College Park, College Park, MD (US)

(72) Inventors: YuHuang Wang, Laurel, MD (US); Xiyuan Cheng, Greenbelt, MD (US); Ayman Alibrahim, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 17/749,696

(22) Filed: May 20, 2022

Related U.S. Application Data

(60) Provisional application No. 63/191,319, filed on May 20, 2021.

(51) Int. Cl.
  *C01B 32/162* (2017.01)

(52) U.S. Cl.
  CPC ........ *C01B 32/162* (2017.08); *C01B 2202/30* (2013.01); *C01P 2002/02* (2013.01); *C01P 2002/82* (2013.01); *C01P 2002/85* (2013.01); *C01P 2002/88* (2013.01); *C01P 2004/03* (2013.01); *C01P 2004/04* (2013.01)

(58) Field of Classification Search
  CPC ... C01B 32/16; C01B 32/162; C01B 2202/30; C01P 2002/02; C01P 2002/82; C01P 2002/85; C01P 2002/88; C01P 2004/03; C01P 2004/04
  See application file for complete search history.

(56) References Cited

U.S. PATENT DOCUMENTS

| | | | |
|---|---|---|---|
| 7,906,095 B2 | 3/2011 | Kawabata | |
| 8,173,211 B2 | 5/2012 | Shaffer et al. | |
| 8,557,190 B2 | 10/2013 | Shiraki et al. | |
| 9,845,243 B2 | 12/2017 | Shanov et al. | |
| 10,933,471 B2 | 3/2021 | Harutyunyan et al. | |
| 2007/0183959 A1* | 8/2007 | Charlier | C01B 32/164 204/173 |
| 2008/0260617 A1* | 10/2008 | Liu | B82Y 40/00 423/447.2 |
| 2011/0168942 A1* | 7/2011 | Hitoe | C08J 5/042 428/292.1 |

OTHER PUBLICATIONS

Design Equations <https://risacher.org/rocket/eqns.html#:~:text=To%20reduce%20losses%20due%20to,known%20as%20%22contraction%20ratio%22.> 2007 (Accessed Sep. 11, 2023).*

(Continued)

*Primary Examiner* — Richard M Rump
(74) *Attorney, Agent, or Firm* — Leydig, Voit & Mayer, Ltd.

(57) ABSTRACT

A method of producing a carbon nanotube may include heating a convergent flow nozzle and a flow chamber of a carbon nanotube reactor, flowing a vaporized reactant stream through the nozzle and collecting a carbon nanotube product from an outlet of a heated flow chamber disposed downstream of the heated convergent flow nozzle. The vaporized reactant stream may include a carbon nanotube nucleation carbon source, a carbon nanotube growth carbon source, and a carbon nanotube catalyst precursor. The nozzle may have a nozzle contraction ratio of from 3:1 to 300:1.

22 Claims, 27 Drawing Sheets

(56) References Cited

OTHER PUBLICATIONS

Horváth, Z. E., et al. "Inexpensive, upscalable nanotube growth methods." Current Applied Physics 6.2 (2006): 135-140.*

Segura-Cardenas, Emmanuel, et al. "Oxygen to carbon atoms ratio effect on the size, morphology and purity of functionalized carbon nanoshells by using alcohol mixtures as carbon source." Carbon 76 (2014): 292-300.*

Aguiar-Hualde (2017) Probing the role of carbon solubility in transition metal catalyzing single-walled carbon nanotubes growth. Carbon 120, 226-232.

Anoshkin et al. (2014) Hybrid carbon source for single-walled carbon nanotube synthesis by aerosol CVD method. Carbon 78, 130-136.

Chauhan et al. (Mar. 2022) Effect of a Metallocene Catalyst Mixture on CNT Yield Using the FC-CVD Process. Catalysts 12, 287.

Chitranshi et al. (Oct. 2020) Carbon Nanotube Sheet-Synthesis and Applications. Nanomaterials 10, 2023.

Dee et al. (2019) Carbon-assisted catalyst pretreatment enables straightforward synthesis of high-density carbon nanotube forests. Carbon 153, 196-205.

Gspann et al. (2014) Spinning of carbon nanotube fibres using the floating catalyst high temperature route: purity issues and the critical role of sulphur. Faraday Discuss. 173, 47-65.

Hoecker et al. (2016) Catalyst nanoparticle growth dynamics and their influence on product morphology in a CVD process for continuous carbon nanotube synthesis. Carbon 96, 116-124.

Hoecker et al. (2017) The influence of carbon source and catalyst nanoparticles on CVD synthesis of CNT aerogel. Chemical Engineering Journal 314, 388-395.

Huang et al. (2012) A review of the large-scale production of carbon nanotubes: The practice of nanoscale process engineering. Chinese Science Bulletin 57, 157-166.

Jiang et al. (2011) Superaligned carbon nanotube arrays, films, and yarns: a road to applications. Advanced Materials 23, 1154-1161.

Kaniyoor et al. (2019) High throughput production of single-wall carbon nanotube fibres independent of sulfur-source. Nanoscale 11, 18483-18495.

Lee et al. (2016) Synthesis of carbon nanotube fibers using the direct spinning process based on Design of Experiment (DOE). Carbon 100, 647-655.

Lee et al. (2019) Direct spinning and densification method for high-performance carbon nanotube fibers. Nature Communications 10: 2962.

Lee et al. (Mar. 2021) Deep-injection floating-catalyst chemical vapor deposition to continuously synthesize carbon nanotubes with high aspect ratio and high crystallinity. Carbon 173, 901-909.

Li et al. (2004) Direct Spinning of Carbon Nanotube Fibers from Chemical Vapor Deposition Synthesis. Science 304, 276-278.

Ma et al. (2016) Control of product nature and morphology by adjusting the hydrogen content in a continuous chemical vapor deposition process for carbon nanotube synthesis. Carbon 107, 171-179.

Mazzucco et al. (2014) Direct evidence of active and inactive phases of Fe catalyst nanoparticles for carbon nanotube formation. Journal of catalysis 319, 54-60.

Mikhalchan et al. (2016) Continuous and scalable fabrication and multifunctional properties of carbon nanotube aerogels from the floating catalyst method. Carbon 102, 409-418.

Park et al. (Mar. 2020) Continuous synthesis of high crystalline carbon nanotubes by controlling the configuration of the injection part in the floating catalyst chemical vapor deposition process. Carbon Letters 30, 613-619.

Paukner et al. (2015) Ultra-pure single wall carbon nanotube fibres continuously spun without promoter. Scientific Reports 4, 3903.

Qi et al. (2006) Synthesis of High-Purity Few-Walled Carbon Nanotubes from Ethanol/Methanol Mixture. Chemistry of Materials 18, 5691-5695.

Rao et al. (2018) Carbon nanotubes and related nanomaterials: critical advances and challenges for synthesis toward mainstream commercial applications. ACS Nano 12, 11756-11784.

Reguero et al. (2014) Controlling Carbon Nanotube Type in Macroscopic Fibers Synthesized by the Direct Spinning Process. Chemistry of Materials 26:3550-3557.

Rinaldi et al. (2011) Dissolved Carbon Controls the Initial Stages of Nanocarbon Growth. Angewandte Chemie International Edition 50, 3313-3317.

Shen et al. (2010) "Double-walled carbon nanotubes: Challenges and Opportunities," Nanoscale 3:503-518.

Tran et al. (2017) Purification and Dissolution of Carbon Nanotube Fibers Spun from the Floating Catalyst Method. ACS Applied Materials & Interfaces 9:37112-37119.

Wang et al. (2018) Continuous Fabrication of Meter-Scale Single-Wall Carbon Nanotube Films and their Use in Flexible and Transparent Integrated Circuits. Advanced Materials 30, 1802057.

Wang et al. (2019) Synthesis of Carbon Nanotubes by Catalytic Chemical Vapor Deposition. Chapter 2 in Perspective of Carbon Nanotubes (Saleh and El-Sheikh, eds), IntechOpen 19 pp.

Zhang et al. (2017) Controlled synthesis of ultralong carbon nanotubes with perfect structures and extraordinary properties. Accounts of Chemical Research 50, 179-189.

Zhang et al. (2017) Growth termination and multiple nucleation of single-wall carbon nanotubes evidenced by in situ transmission electron microscopy. ACS Nano 11, 4483-4493.

Zhang et al. (2019) "Recent developments in Single-Walled Carbon Nanotube Thin Films Fabricated by Dry Floating Catalyst Chemical Vapor Deposition," in Single-Walled Carbon Nanotubes, Eds. Yan Li et al. 99-128 (Springer).

Zhang et al. (Aug. 2020) Transparent and Freestanding Single-Walled Carbon Nanotube Films Synthesized Directly and Continuously via a Blown Aerosol Technique. Advanced Materials, 32, 2004277.

Zhou et al. (May 2021) The synergetic relationship between the length and orientation of carbon nanotubes in direct spinning of high-strength carbon nanotube fibers. Materials and Design 203, 109557.

* cited by examiner $d_1 = 0.16$ inch $d_1 = 0.08$ inch

SYSTEMS AND METHODS OF MAKING CARBON NANOTUBES

CROSS-REFERENCE TO RELATED APPLICATIONS

This application claims the benefit of priority to U.S. Provisional Patent Application No. 63/191,319, filed May 20, 2021, which is hereby incorporated by reference in its entirety.

STATEMENT REGARDING FEDERALLY SPONSORED RESEARCH OR DEVELOPMENT

This invention was made with government support under DE-EE0007865 awarded by the Department of Energy. The government has certain rights in the invention.

BACKGROUND OF INVENTION

Carbon nanotubes (CNTs), particularly their single-walled and double-walled variants, are lightweight, strong, and thermally and electrically conductive, promising a wide range of energy technologies. However, it has been challenging to synthesize high quality CNTs at large scale. Current methods either have a high production rate of up to tons per day, but with high defect density and broad distribution of diameters, or produce defect-free, monodispersed CNTs at a very low yield. Therefore, it is essential to develop a new synthesis method to achieve both high-quality and high-yield CNT production.

Among the many CNT synthesis methods, floating catalyst chemical vapor deposition (FCCVD) has shown a great deal of controllability, scalability, and low cost. In a typical process, ferrocene and carbon feedstocks are mixed and injected into a high-temperature furnace. The self-catalyzed ferrocene decomposition starts and accelerates around 400-450° C., producing iron atoms that nucleate into small iron clusters at a rate dependent on the temperature and its partial pressure. The small iron clusters will subsequently agglomerate into catalytic nanoparticles with a relatively wide size distribution. Meanwhile, the carbon feedstock decomposes into active carbon starting at around 650-700° C. The catalyst nanoparticles will travel a relatively long time before interacting with active carbon because of the temperature difference between ferrocene and carbon feedstocks. A considerable portion of the nanoparticles coarsen or grow oversized due to the Kelvin (curvature) effect before active carbon becomes accessible for CNT growth, resulting in a low catalyst efficiency.

SUMMARY

The presently disclosed subject matter relates generally to carbon nanotubes and a system and methods of making the same. In some embodiments, the carbon nanotubes are double-walled carbon nanotubes (DWCNTs). In some embodiments, the carbon nanotubes are single-walled carbon nanotubes (SWCNTs). In some embodiments, the carbon nanotubes are highly pure. For example in some embodiments the carbon nanotubes comprise at least 97 at. % carbon, preferably, at least 98 at. % carbon, and more preferably at least 98.6 at. % carbon. In some embodiments, the carbon nanotubes are largely free of amorphous carbon and metal. For example, in some embodiments, the carbon nanotubes comprise not greater than approximately 2 at. %, preferably not greater than 1.6 at. %, and more preferably not greater than 1.4 at. %. In some embodiments, the carbon nanotubes can be directly drawn from the reactor as a continuous thin film at a uniquely high rate. For example, in some embodiments, the process may produce a continuous thin film of carbon nanotubes at a rate of 1400 m/hr or higher. For example, in some embodiments, the process may produce a continuous thin film of carbon nanotubes at a rate of at least 2000 m/hr. For example, in some embodiments, the process may produce a continuous thin film of carbon nanotubes at a rate reaching approximately 4500 m/hr. In certain embodiments, the system includes a reactor with a custom-designed nozzle that focuses catalyst precursor (e.g., ferrocene) and other reagents in a smaller space than a traditional reactor would. In certain embodiments, a highly reactive carbon source species, e.g., toluene, that thermally decomposes at a relatively lower temperature is introduced to the reaction to produce a concentration spike of carbon that makes carbon readily available for the catalytic nucleation of nanotubes. In certain embodiments, an alkyl alcohol-methanol mixture (e.g., ethanol-methanol mixture), which has higher thermal stability than the highly reactive nucleation carbon source, is used as the primary feedstock to deliver the carbon feedstock far into the reactor for the continuous growth of carbon nanotubes.

In one embodiment, a method of producing a carbon nanotube comprises: heating a convergent flow nozzle and a flow chamber of a carbon nanotube reactor, the carbon nanotube reactor having a heated flow chamber disposed downstream of the heated convergent flow nozzle; flowing a vaporized reactant stream through the nozzle, the vaporized reactant stream comprising: a carbon nanotube nucleation carbon source, a carbon nanotube growth carbon source, and a carbon nanotube catalyst precursor; and collecting a carbon nanotube product from an outlet of the heated flow chamber, wherein the nozzle has a nozzle contraction ratio of from 3:1 to 300:1.

In one embodiment, the convergent flow nozzle has a nozzle contraction ratio of from 2:1 to 500:1. In one embodiment, the convergent flow nozzle has a nozzle contraction ratio of from 10:1 to 300:1. In one embodiment, the convergent flow nozzle has a nozzle contraction ratio of from 15:1 to 300:1. In one embodiment, the convergent flow nozzle has a nozzle contraction ratio of from 10:1 to 100:1. In one embodiment, the convergent flow nozzle has a nozzle contraction ratio of from 50:1 to 150:1. In one embodiment, the convergent flow nozzle has a nozzle contraction ratio of from 10:1 to 100:1. In one embodiment, the convergent flow nozzle has a nozzle contraction ratio of from 50:1 to 300:1. In one embodiment, the convergent flow nozzle has a nozzle contraction ratio of from 15:1 to 50:1. In one embodiment, the convergent flow nozzle has a nozzle contraction ratio of from 15:1 to 100:1.

In one embodiment the carbon nanotube product comprises at least 95 at. % carbon. In one embodiment the carbon nanotube product comprises at least 96 at. % carbon. In one embodiment the carbon nanotube product comprises at least 97 at. % carbon. In one embodiment the carbon nanotube product comprises at least 98 at. % carbon. In one embodiment the carbon nanotube product comprises at least 98.6 at. % carbon.

In one embodiment the carbon nanotube product comprises less than 5 at. % amorphous carbon and/or metal. In one embodiment the carbon nanotube product comprises less than 2.5 at. % amorphous carbon and/or metal. In one embodiment the carbon nanotube product comprises less than 2 at. % amorphous carbon and/or metal. In one embodiment the carbon nanotube product comprises less than 1.5 at. % amorphous carbon and/or metal.

In one embodiment, the method comprises forming catalyst particles from the catalyst precursor in the carbon nanotube reactor.

In one embodiment, at least 95% of the catalyst particles exiting the reactor have a mean diameter of not greater than 16 nm. In one embodiment, at least 96% of the catalyst particles exiting the reactor have a mean diameter of not greater than 16 nm. In one embodiment, at least 97% of the catalyst particles exiting the reactor have a mean diameter of not greater than 16 nm. In one embodiment, at least 98% of the catalyst particles exiting the reactor have a mean diameter of not greater than 16 nm.

In one embodiment, the median diameter of catalyst particles exiting the reactor is from 1 to 10 nm. In one embodiment, the median diameter of catalyst particles exiting the reactor is from 3 to 9 nm. In one embodiment, the median diameter of catalyst particles exiting the reactor is from 4 to 8 nm.

In one embodiment, the catalyst precursor comprises iron. In one embodiment, the catalyst precursor comprises iron and nickel. In one embodiment, the catalyst precursor comprises ferrocene and/or nickelocene. In one embodiment, the catalyst precursor comprises nickelocene and ferrocene in a ratio of 1:1000 to 1:10 nickelocene:ferrocene by weight. In one embodiment, the catalyst precursor comprises nickelocene and ferrocene in a ratio of 1:100 to 1:1000 nickelocene:ferrocene by weight. In one embodiment, the catalyst precursor comprises nickelocene and ferrocene in a ratio of 1:1 to 1:10 nickelocene:ferrocene by weight. In one embodiment, the catalyst precursor comprises nickelocene and ferrocene in a ratio of 1:1000 to 1:20 nickelocene:ferrocene by weight. In one embodiment, the catalyst precursor comprises nickelocene and ferrocene in a ratio of 1:100 to 1:20 nickelocene:ferrocene by weight. In one embodiment, the catalyst precursor is ferrocene. In one embodiment, the catalyst precursor is a mixture of nickelocene and ferrocene. In one embodiment, the catalyst precursor is a mixture of nickelocene and ferrocene, wherein the weight ratio of nickelocene: ferrocene ranges from 1:1000 to 1:20. In one embodiment, the catalyst precursor is a mixture of nickelocene and ferrocene, wherein the weight ratio of nickelocene: ferrocene ranges from 1:1000 to 1:20.

In one embodiment, the ratio of C to Fe in the vaporized reactant mixture ranges from 40 to 1000. In one embodiment, the ratio of C to Fe in the vaporized reactant mixture ranges from 60 to 800. In one embodiment, the ratio of C to Fe in the vaporized reactant mixture ranges from 100 to 800. In one embodiment, the ratio of C to Fe in the vaporized reactant mixture ranges from 100 to 500. In one embodiment, the ratio of C to Fe in the vaporized reactant mixture ranges from 80 to 500. In one embodiment, the ratio of C to Fe in the vaporized reactant mixture ranges from 80 to 250.

In one embodiment, the ratio of carbon atoms of the nanotube nucleation carbon source to carbon atoms of the nanotube growth carbon source in the vaporized reactant mixture is from 1:10 to 10:1. In one embodiment, the ratio of carbon atoms of the nanotube nucleation carbon source to carbon atoms of the nanotube growth carbon source in the vaporized reactant mixture is from 1:5 to 5:1. In one embodiment, the ratio of carbon atoms of the nanotube nucleation carbon source to carbon atoms of the nanotube growth carbon source in the vaporized reactant mixture is from 1:1 to 10:1. In one embodiment, the ratio of carbon atoms of the nanotube nucleation carbon source to carbon atoms of the nanotube growth carbon source in the vaporized reactant mixture is from 1:1 to 5:1.

In one embodiment, the nanotube nucleation carbon source comprises an aromatic hydrocarbon or a derivative thereof. In one embodiment, the nanotube nucleation carbon source is a heteroaromatic compound. In one embodiment, the nanotube nucleation carbon source is selected from the group consisting of: toluene, benzene, pyridine and combinations thereof. In one embodiment, the nanotube nucleation carbon source comprises toluene. In one embodiment, the nanotube nucleation carbon source is toluene.

In one embodiment, the nanotube growth carbon source comprises ethanol. In one embodiment, the nanotube growth carbon source is ethanol. In one embodiment, the nanotube growth carbon source comprises an alkyl alcohol having 2-6 carbon atoms or a mixture thereof. In one embodiment, the nanotube growth carbon source comprises an alkyl alcohol having 2-4 carbon atoms or a mixture thereof.

In one embodiment, the vaporized reactant stream comprises methanol as an etchant. The presence of methanol may help control the deleterious formation of amorphous carbon and/or metal in the carbon nanotube product.

In one embodiment, the vaporized reactant stream comprises methanol and alkyl alcohol in a ratio of 5:1 to 500:1 methanol:alkyl alcohol. In one embodiment, the vaporized reactant stream comprises methanol and alkyl alcohol in a ratio of 7:1 to 200:1 methanol:alkyl alcohol. In one embodiment, the vaporized reactant stream comprises methanol and alkyl alcohol in a ratio of 10:1 to 100:1 methanol:alkyl alcohol.

In one embodiment, the vaporized reactant stream comprises methanol and ethanol in a ratio of 5:1 to 500:1 methanol:ethanol. In one embodiment, the vaporized reactant stream comprises methanol and ethanol in a ratio of 7:1 to 200:1 methanol:ethanol. In one embodiment, the vaporized reactant stream comprises methanol and ethanol in a ratio of 10:1 to 100:1 methanol:ethanol.

In one embodiment, the method comprises heating the nozzle to a temperature of 500° C. to 1100° C. In one embodiment, the method comprises heating the nozzle to a temperature of 600° C. to 1000° C. In one embodiment, the method comprises heating the nozzle to a temperature of 900° C. to 1100° C.

In one embodiment, the method of any of the preceding claims comprises heating the flow chamber to a temperature of 900° C. to 1250° C. In one embodiment, the method of any of the preceding claims comprises heating the flow chamber to a temperature of 1000° C. to 1200° C.

In one embodiment, the vaporized reactant stream comprises: 90 to 98.5 wt. % methanol; 0.05 to 5 wt. % ethanol; 0.2 to 1 wt. % ferrocene; 0.02 to 0.2 wt. % thiophene; and 1.5 to 4 wt. % toluene. In one embodiment, the vaporized reactant stream comprises: 93 to 98 wt. % methanol; 0.1 to 3 wt. % ethanol; 0.4 to 0.45 wt. % ferrocene; 0.05 to 0.1 wt. % thiophene; and 2.5 to 2.8 wt. % toluene.

In one embodiment, the vaporized reactant stream is carried into the nozzle and through the heated flow chamber by a non-reactive carrier gas. In one embodiment, the non-reactive carrier gas is nitrogen, helium, neon, argon, krypton, xenon, radon, and/or combinations thereof. In one embodiment, the non-reactive carrier gas is nitrogen. In one embodiment, the non-reactive carrier gas does not contain hydrogen.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, embodiments of the present disclosure can nonetheless be operative and useful.

BRIEF DESCRIPTION OF THE DRAWINGS

FIG. 2A shows a carbon nanotube (CNT) sample synthesized with ethanol as the only carbon feedstock.

FIG. 2B shows a CNT sample synthesized with toluene and ethanol.

FIG. 2C shows a CNT sample synthesized with modified temperature profile using a convergent flow nozzle in accordance with one aspect of the present disclosure.

FIG. 4C: 96.8 mol % methanol. FIG. 4D: 96.2 mol % methanol. FIG. 4E: 94.2 mol % methanol.

FIG. 5A shows a photograph of CNT film being directly and continuously collected on a winding drum. FIG. 5B shows an SEM image of the CNT networks, with scale bar as shown. FIG. 5C shows Raman spectra of the CNT sample. The average G/D ratios were 71.1±3.7 and 77.3±5.1 for the 532 nm and 633 nm excitation lines, respectively. FIGS. 5D-5E show TEM images of product CNTs with low catalyst content and indicating that 70% of the CNTs are single-walled CNTs, with scale bars as shown. FIG. 5F: shows an atomic force microscopy (AFM) image illustrating the average length of CNTs is above 5 μm. FIG. 5G: shows a graph of diameter distribution of DWCNTs. FIG. 5H: TGA (Thermogravimetric Analysis) showing a weight loss of 91.4%, corresponding to a C atomic percent of 98.6%.

FIG. 9C shows an EDS scan over the circled area of the SEM of as-synthesized CNT of FIG. 9A. The oxygen peak is very low. FIG. 9D shows a linear EDS scan along the indicated line in FIG. 9B. The three lines in FIG. 9D (A-C) from highest to lowest are the signals of Fe (line A), O (line B), and S (line C), respectively.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

Figure 3A:
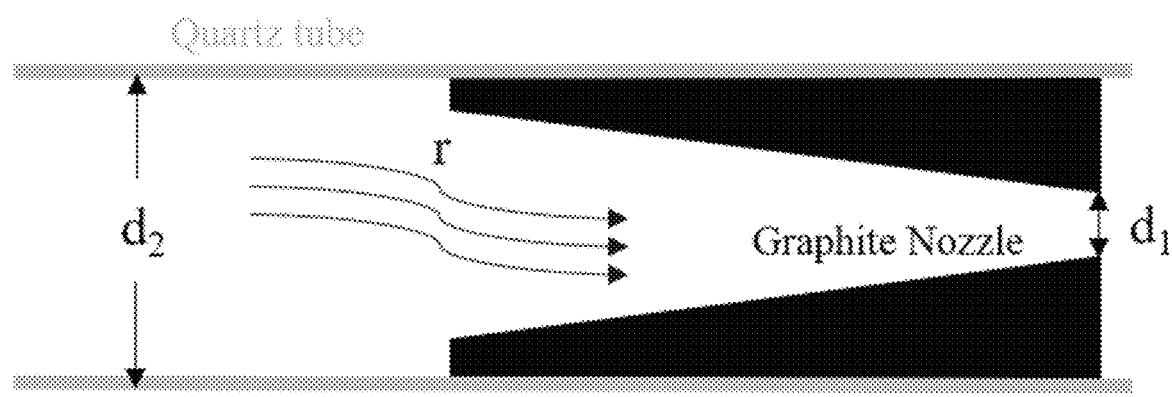
FIG. 3A shows a schematic of a cross section of the flow path of an exemplary convergent flow nozzle. The distance d2 is the inner diameter of the quartz reactor tube, d1 is the nozzle orifice diameter, and r is the flow rate of the vaporized mixture of precursors. Accordingly, the partial pressure of carbon [C] is proportional to $$r\left(\frac{d_2}{d_1}\right)^2.$$
Figure 3B:
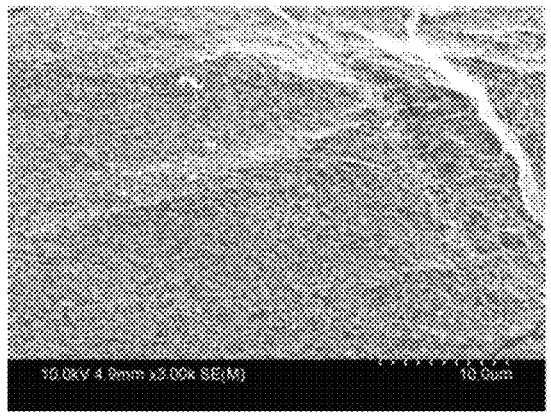
FIGS. 3B-3C show SEM (Scanning Electron Microscopy) images at different scales as shown of a CNT sample synthesized with a convergent flow nozzle having a 0.32 inch nozzle orifice diameter (d1) inside a quartz reactor tube having a diameter of 1.33 inches (d2).
Figure 3C:
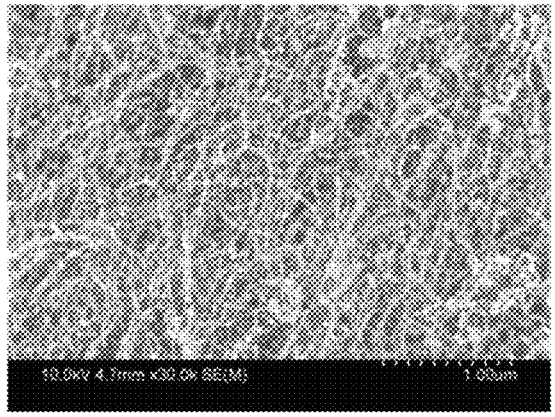
Figure 3D:
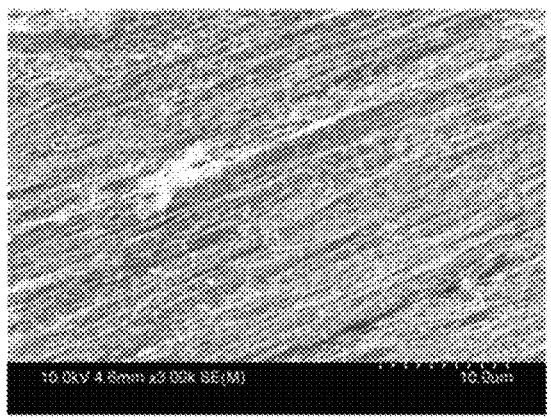
FIGS. 3D-3E show SEM images at different scales as shown of a CNT sample synthesized with a convergent flow nozzle having a 0.16 inch nozzle orifice diameter (d1) inside a quartz reactor tube having a diameter of 1.33 inches (d2).
Figure 3E:
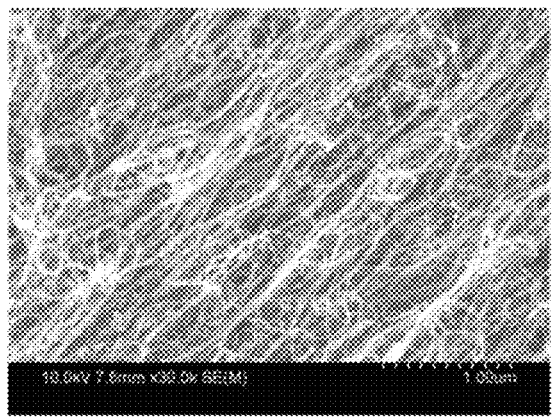
Figure 3F:
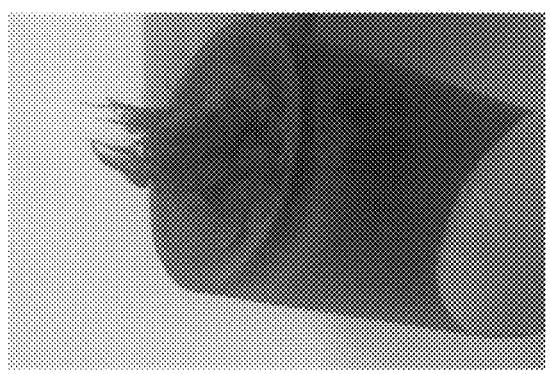
FIG. 3F is a photo of a convergent flow nozzle with 0.08 inch nozzle orifice diameter (d1) after the experiment.
Figure 3G:
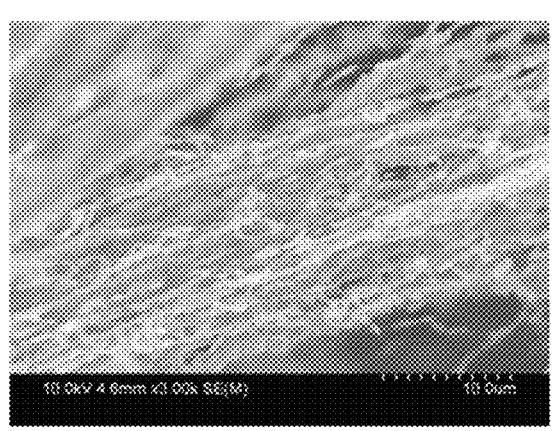
FIGS. 3G-3H show SEM images at different scales as shown of a CNT sample synthesized with a convergent flow nozzle having a 0.08 inch nozzle orifice diameter (d1) inside a quartz reactor tube having a diameter of 1.33 inches (d2).
Figure 3H:
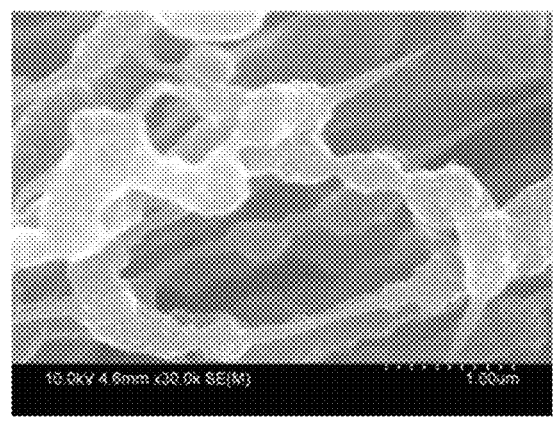

As used herein, the term nozzle contraction ratio means the ratio of the cross-sectional area available for fluid flow at the nozzle inlet to that at the narrowest point of the nozzle. Thus, for nozzles having a round cross-section orthogonal to flow, the nozzle contraction ratio may be expressed as $(d2/d1)^2$ where d2 is the diameter available for flow at the nozzle inlet and d1 is the diameter of the narrowest point of the nozzle. For nozzles which fit inside a flow tube, such as the nozzle of FIG. 3A the diameter available for flow at the nozzle inlet is the inner diameter of the flow tube.

As used herein, the term convergent nozzle means a nozzle having a decreasing cross-sectional area in the direction of flow. Accordingly, fluid flowing though a convergent nozzle may be forced to accelerate. Furthermore, fluid flowing though a convergent nozzle may drop in pressure due to the Bernoulli principle.

As used herein, the term C/Fe ratio means the ratio of carbon atoms (excluding any carbon from methanol) to iron atoms in the vaporized reactant stream.

As used herein, the term carbon nanotube growth carbon source is a carbon source that generally decomposes to form C atoms at a relatively higher temperature than a carbon nanotube nucleation carbon source, such that carbon atom formation is delayed until after catalyst particles are formed. Growth carbon sources include alkyl alcohols (other than methanol), including without limitation, ethanol, propanol (all isomers thereof), butanol (all isomers thereof), pentanol (all isomers thereof) and hexanol (all isomers thereof), cyclobutanol, cyclopentanol, and cyclohexanol; and alkanes such as methane, ethane, and propane.

As used herein, the term carbon nanotube nucleation carbon source is a carbon source that generally decomposes to form C atoms at a relatively lower temperature than a carbon nanotube growth carbon source, such that carbon atom formation occurs when catalyst particles are being formed. In some embodiments, a carbon nanotube nucleation carbon source can be selected such that it decomposes at the appropriate temperature to flood the process with available C atoms just as the catalyst particles are reaching the optimal size for nanotube nucleation. Thus, more of the catalyst particles may nucleate carbon nanotubes, rather than continue to grow beyond the optimal size, than would otherwise occur absent the nucleation carbon source. Nucleation carbon sources include aromatic hydrocarbons with one or two aromatic rings, such as benzene, toluene, xylene, and biphenyl, aromatic heterocyclic compounds having a single aromatic ring and having one or two N in that ring, such as pyridine, as well as highly reactive species unsaturated hydrocarbons, such as acetylene and ethylene.

Carbon nanotube product is the product of methods described herein that comprises carbon nanotubes in individual forms (separate carbon nanotubes), in various aggregates of carbon nanotubes, such as bundles, or in a macroscopic form such as a film or fiber. Carbon nanotube product can contain SWNTs, DWNTs and/or MWCNTs and various combinations thereof. In certain embodiments, carbon nanotube product contains predominantly (greater than 50% by weight) of SWNTs. In certain embodiments, carbon nanotube product contains predominantly (greater than 50% by weight) of DWNTs. In certain embodiments, carbon nanotube product contains minimal amounts of MWNTs (less than 20% by weight).

Carbon nanotubes can be single-walled carbon nanotubes (SWCNTs) or multi-walled carbon nanotubes (MWCNTs). SWCNTs can be described as graphene sheets seamlessly rolled to form hollow cylinders. SWCNTs consist of only one graphene layer. In contrast, a MWCNT can be described as a concentric arrangement of SWCNTs, consisting of multiple layers of graphene with each layer rolled into a tube shape. A specific form of MWCNTs are double-walled carbon nanotubes (DWCNTs). DWCNTs are coaxial nanostructures composed of exactly two single-walled carbon nanotubes, one nested in another. See: Shen C. et al. (2010) "Double-walled carbon nanotubes: Challenges and Opportunities," Nanoscale 3:503-518.

In an embodiment, a composition or compound, such as an alloy or precursor to an alloy, is isolated or substantially purified. In an embodiment, an isolated or purified compound is at least partially isolated or substantially purified as would be understood in the art. In an embodiment, a substantially purified composition, compound or formulation has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components, and methods of the present disclosure are set forth to provide a thorough explanation of the precise nature of the various embodiments described herein. It will be apparent to those of skill in the art that such embodiments can be practiced without these specific details.

Figure 1A:
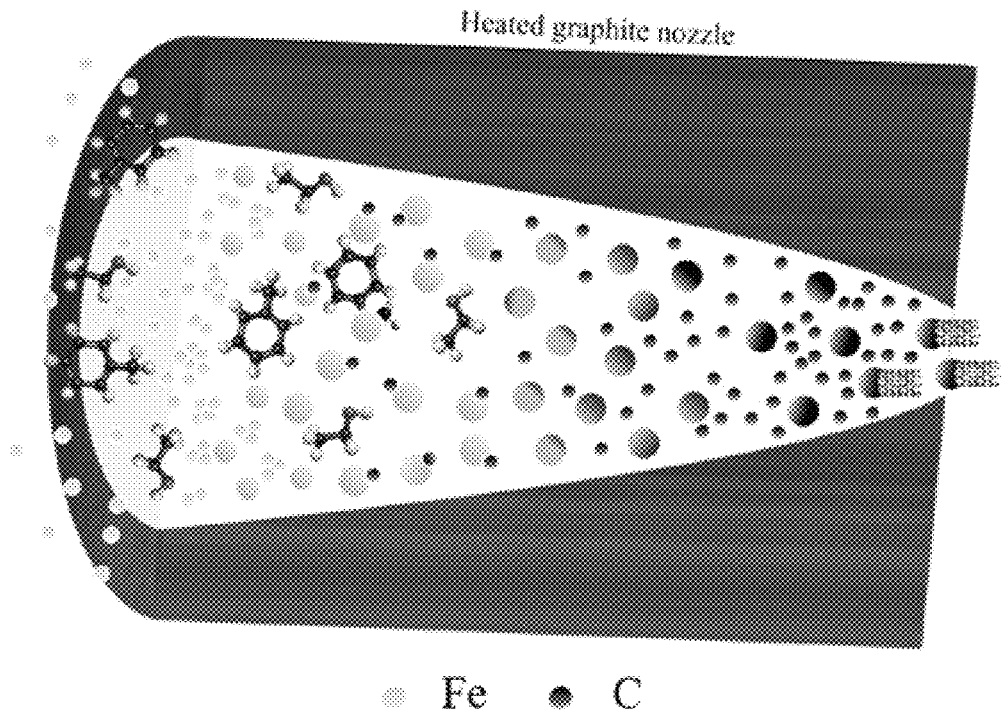
FIG. 1A is a graphic representation of nanotube nucleation via a convergent flow nozzle in accordance with one aspect of the present disclosure. The nucleation and aggregation of the iron nanoparticles are dependent on the concentration of active carbon.
Figure 1B:
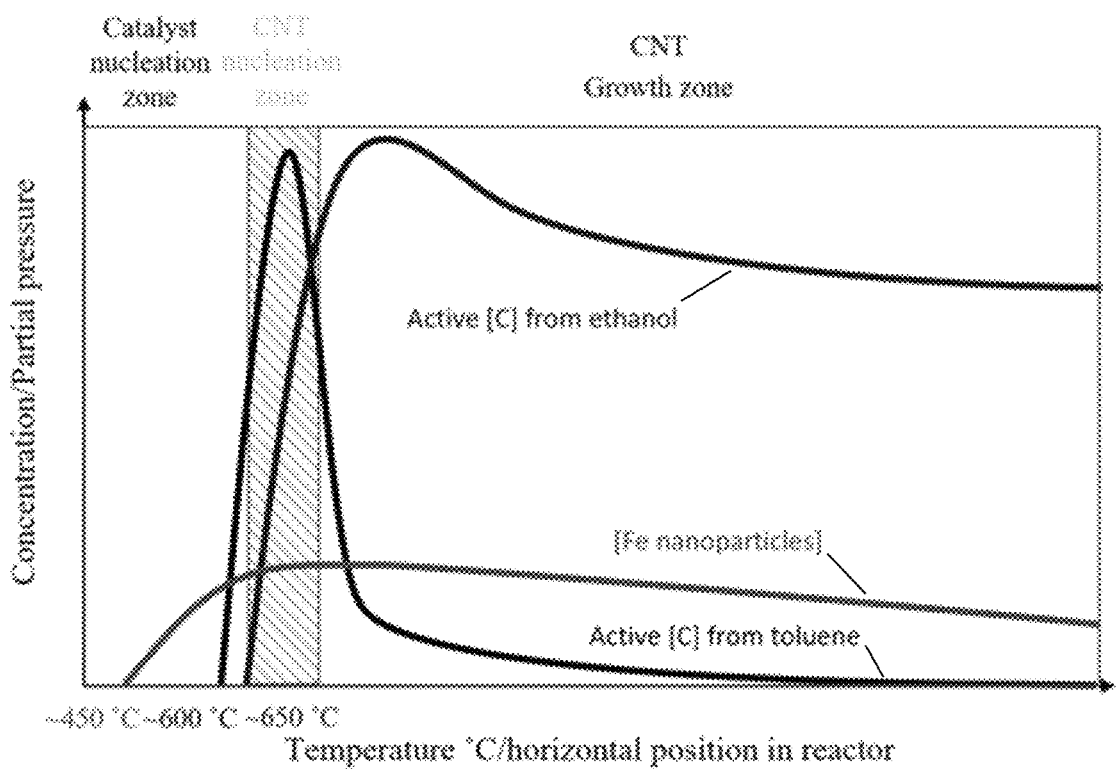
FIG. 1B is a graphic representation of concentration/partial pressure of active carbon and Fe as a function of temperature as varied by horizontal position in the reactor/temperature.

Using the disclosed systems and methods, it is possible to efficiently convert hydrocarbons into high quality carbon nanotubes cleanly at high rates in a continuous process. The synthesized nanotubes are highly pure (e.g., >98.6 at. % carbon), largely free of amorphous carbon and metal (e.g., <1.4 at. %), and can be directly drawn from the reactor as a continuous thin film at an unprecedented high rate of 1400 m/hr and can reach as high as 4500 m/hr. This high rate of clean synthesis may be achieved through a set of synergistic conditions, which in some embodiments includes (1) the use of a convergent flow nozzle that focuses the ferrocene and other reagents in a smaller space; (2) introduction of toluene—a highly reactive species that thermally decomposes at a lower temperature—to produce a concentration spike of carbon to make carbon readily available for the catalytic nucleation of nanotubes; and (3) use of an ethanol-methanol mixture, which has higher thermal stability than toluene, as the primary feedstock to deliver the carbon feedstock far into the reactor for the continuous growth of carbon nanotubes (FIGS. 1A-1B). Without wishing to be bound by theory, it is postulated that as an iron nanoparticle grows from ferrocene or iron atoms, there exists a minimum critical size at which the nanoparticle can efficiently nucleate a nanotube if carbons are abundantly available. Accordingly, overgrowth of the iron nanoparticle, whose size determines the nanotube diameter with the catalytic effect eventually deactivated at large particle sizes, may be prevented by producing a concentration spike of carbon at the right time to encourage the nucleation of CNTs from the iron nanoparticle.

Turning now to FIG. 1B, the synergistic effect of the convergent flow nozzle combined with an appropriate nanotube nucleation and growth carbon sources is illustrated. In the illustrated embodiment, the nanotube nucleation carbon source decomposes to liberate active carbon just as the catalyst particles are reaching the optimal size. This initial spike in active carbon may serve to slow the growth of the catalyst particles by nucleating carbon nanotubes on the catalyst particles. Next, just as the concentration of active carbon from the carbon nanotube nucleation source is dissipating, the nanotube growth carbon source decomposes, providing a second spike of active carbon, the second spike having a long tail. Thus, there is sufficient active carbon available along the length of the reactor such that the nanotubes grow efficiently throughout the reactor.

Figure 2A:
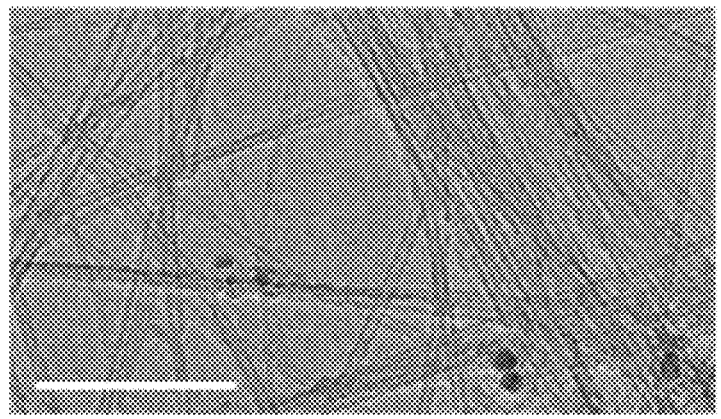
FIGS. 2A-2C show TEM (Transmission Electron Microscopy) characterizations with different catalyst nucleation conditions.
Figure 2B:
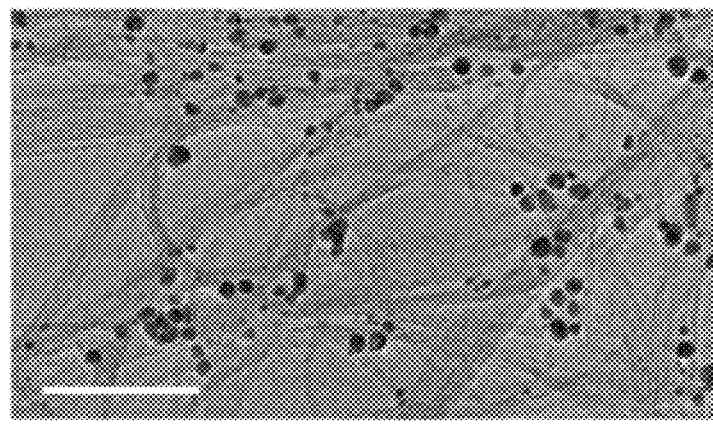
Figure 2C:
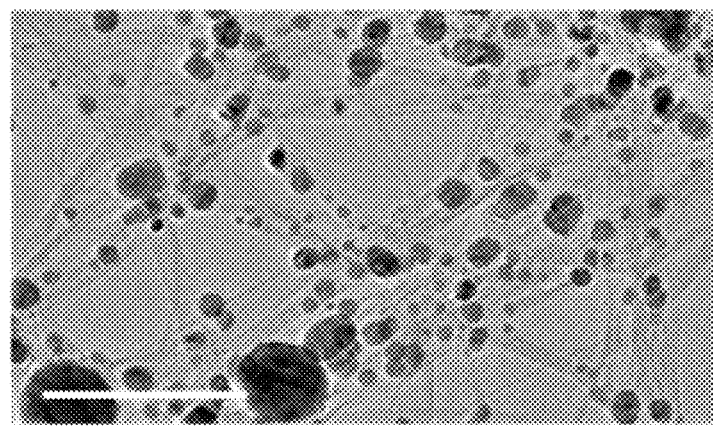
Figure 2D:
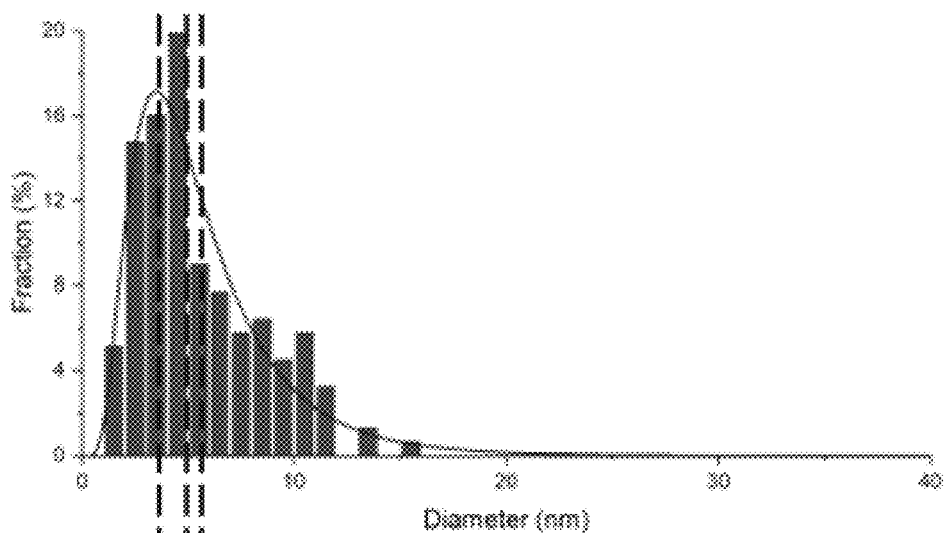
FIGS. 2D-2F show diameter distributions of the catalyst nanoparticles corresponding to the CNT samples shown in FIGS. 2A-2C, respectively. The histogram was fitted with a Lognormal distribution. All CNT samples were synthesized with the same C/Fe ratio of 80 and injection rate 0.2 ml·min$^{-1}$
Figure 2E:
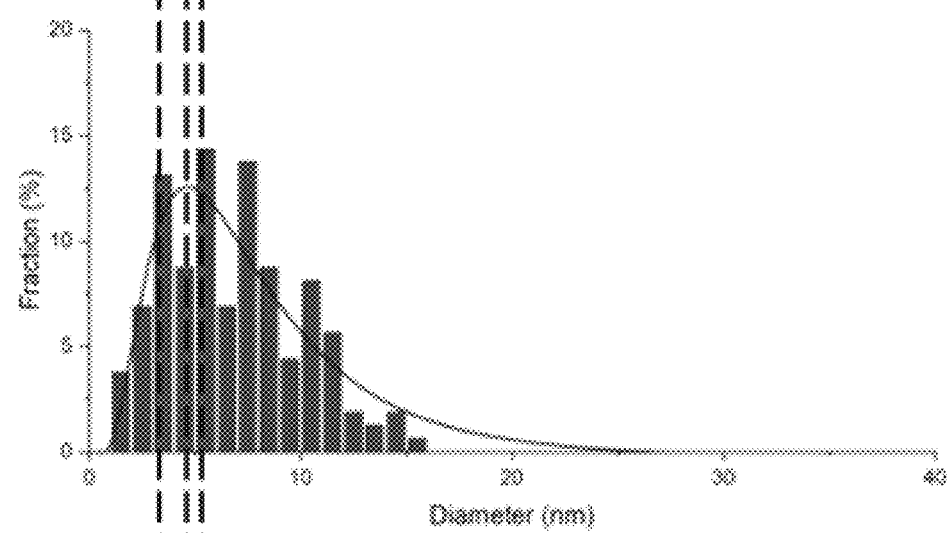
Figure 2F:
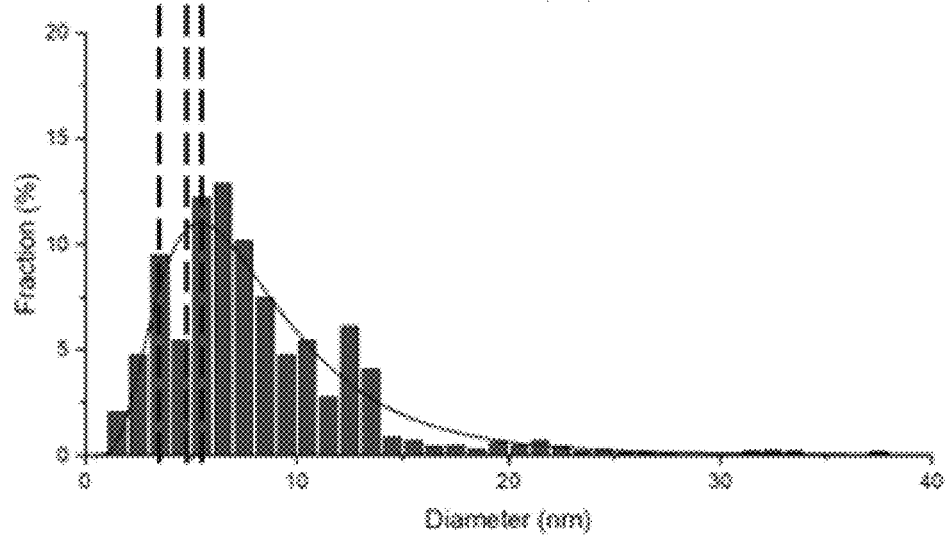

This strategy may overcome the formation of large metal particles that compromise the nanotube quality in a conventional CVD process. Transmission electron microscopy (TEM) directly confirms the cleanness and uniformity of the nanotubes that are synthesized. FIGS. 2A-2F compare the catalyst particle sizes and distribution of nanotubes synthesized by this method with control experiments that are performed without the nozzle or the toluene. Size analysis shows with the nozzle, the catalyst particles shift to a smaller size with a much lower mean diameter (4.83+/−0.59) compared with the control (6.80+/−0.62) (FIGS. 2A, 2B and 2D).

Importantly, the introduction of toluene has a significant impact on the particle size distribution. The catalyst size distributions and the synthesized nanotubes were compared, with and without toluene, under the same iron/carbon ratio (FIGS. 2B-2D), and lower mean diameter and narrower distribution of 6.80±0.62 were observed compared with the control experiment (7.29±0.68) in narrowing the size distribution. Additionally, the large particle tails (>16 nm, 6.27%) in the control, are eliminated (FIG. 2C).

In some embodiments, carbon nanotube reactors in accordance with the present disclosure may be equipped with a nozzle assembly composed of a graphite nozzle and several concentric alumina tubes which create a larger temperature jump due to the large difference of the infrared radiation absorption coefficient and thermal conductivity between graphite and alumina. Therefore, the traveling time of the iron species may be shortened before they start to interact with carbon, and the active carbon atoms will be immediately available when the catalyst particle has grown to the target size, which helps to initiate the growth of the crystalline sp2 carbon that acts as a barrier to block further aggregation of the catalyst particles, and start the growing stage of the CNT. With the interference of active carbon species, the agglomeration of the small iron clusters can be reduced due to decreased probability of collision. It has also been demonstrated that pre-dissolved carbon on the surface or sub-surface of the catalyst has a significant effect on the catalyst activity by changing the carbon diffusion rate. We obtain cleaner, less defective, tunable wall number carbon nanotubes and are able to make them at a scale of 1400 meters per hour (FIGS. 2A-2F).

In some embodiments, the target size of the catalyst particles may be around 0.1-10 nm. In some embodiments, the target size of the catalyst particles may be around 0.4-5 nm. In some embodiments, the target size of the catalyst particles may be around 0.5-2 nm.

Example 1—High Speed, High Purity Carbon Nanotube Production

Figure 6:
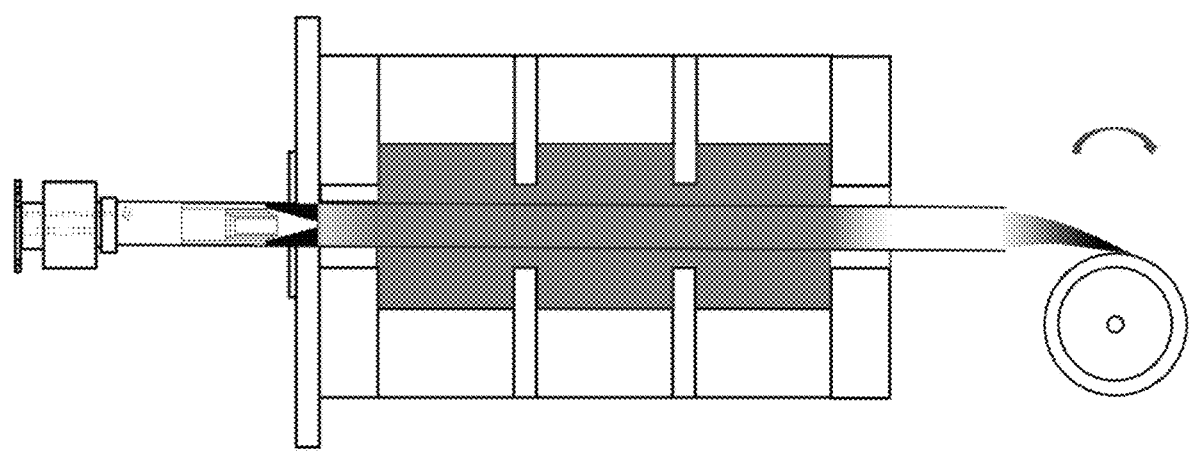
FIG. 6 shows a schematic of an exemplary carbon nanotube reactor with heater block and winding drum for collection of CNT film.
Figure 7:
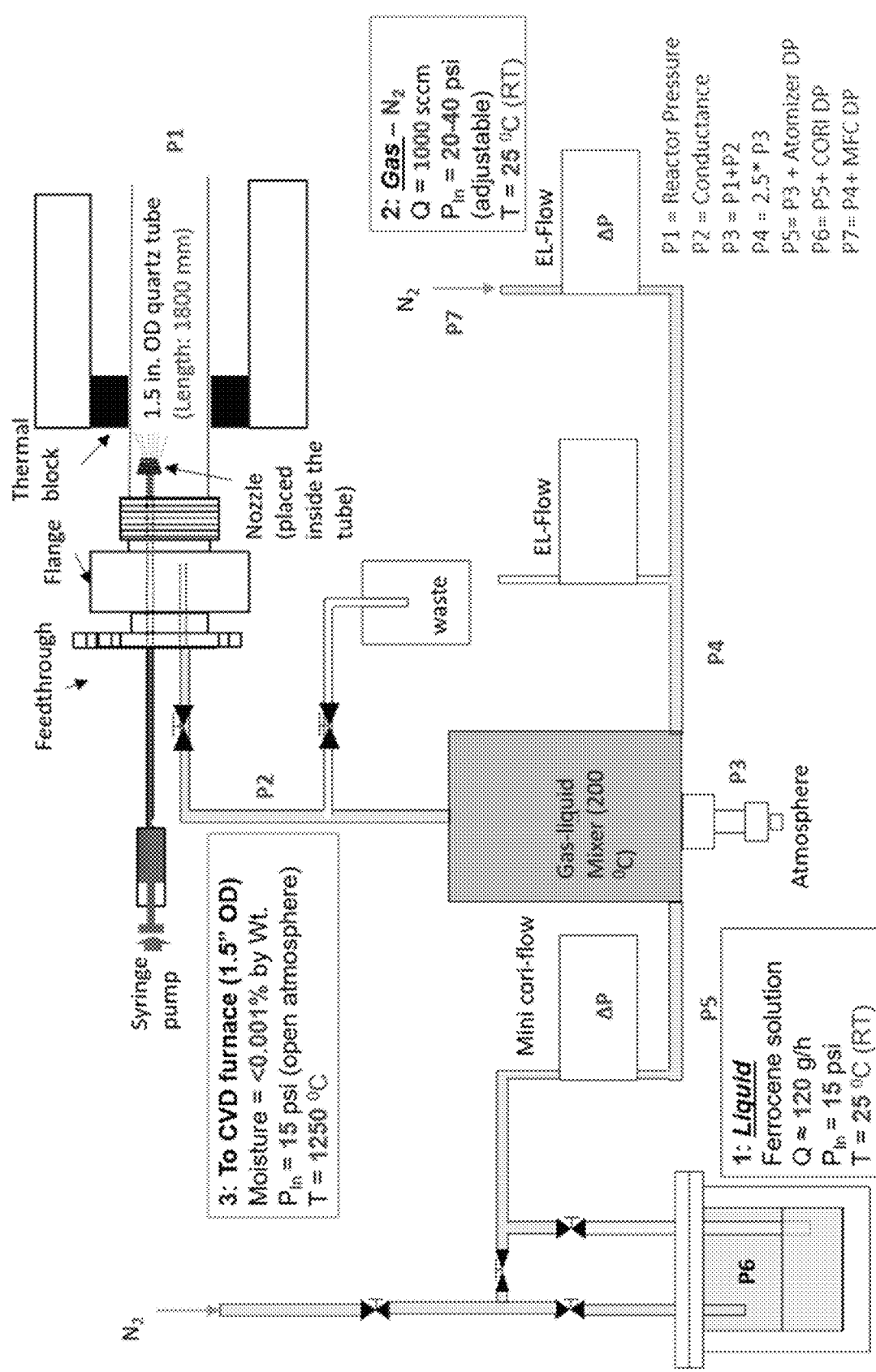
FIG. 7 shows a schematic of an exemplary controlled evaporator and mixer system (CEM) for use with an exemplary reactor of this invention. The system contains an EL-Flow controller and a Mini Cori-flow controller for precise carrier gas and fluid delivery. The CEM 3-way mixing valve and evaporator ensure the total evaporation and mixing before final delivery.
Figure 8:
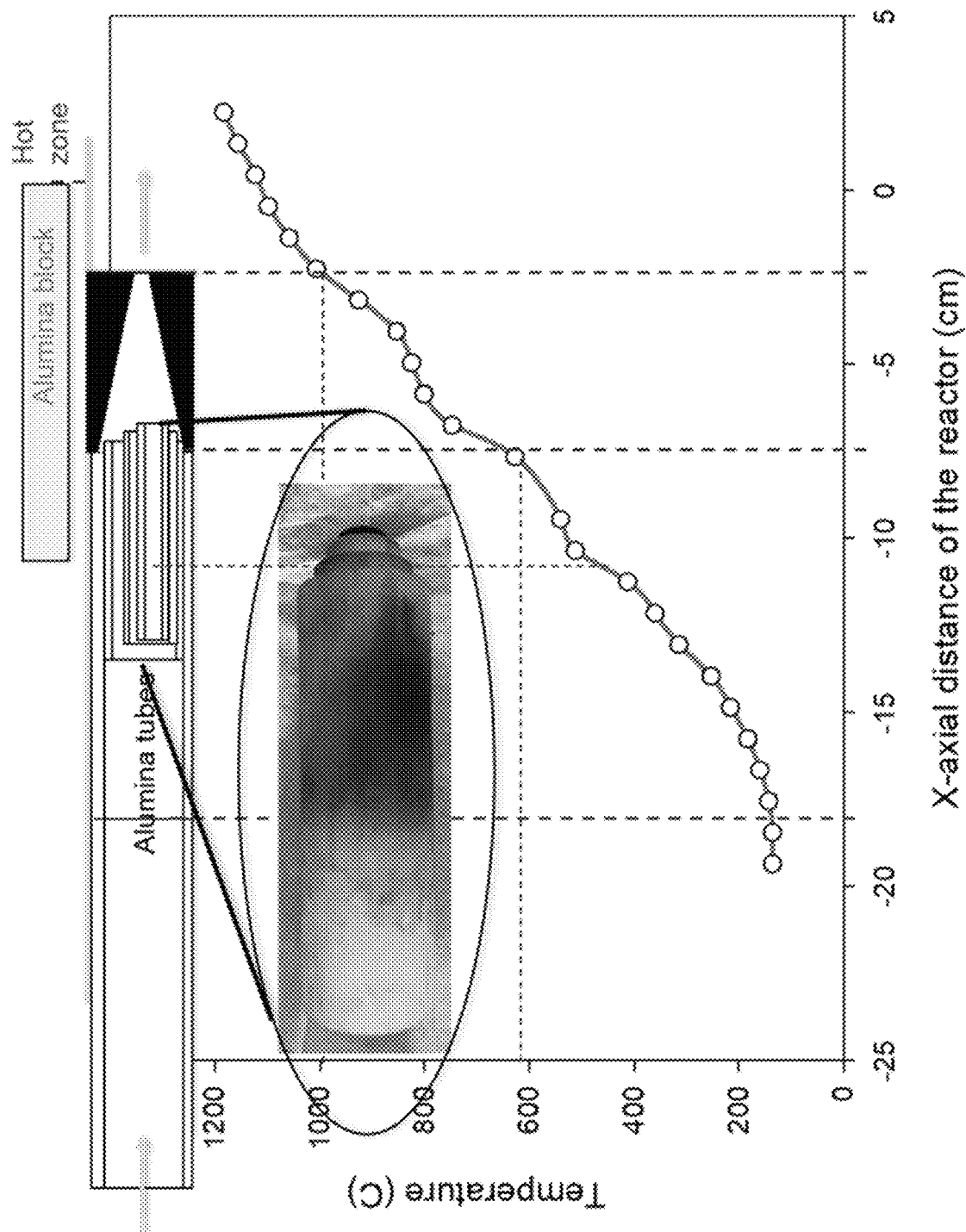
FIG. 8 is an illustration of the upstream temperature gradient of the reactor equipped with the convergent flow nozzle assembly.
Figure 9A:
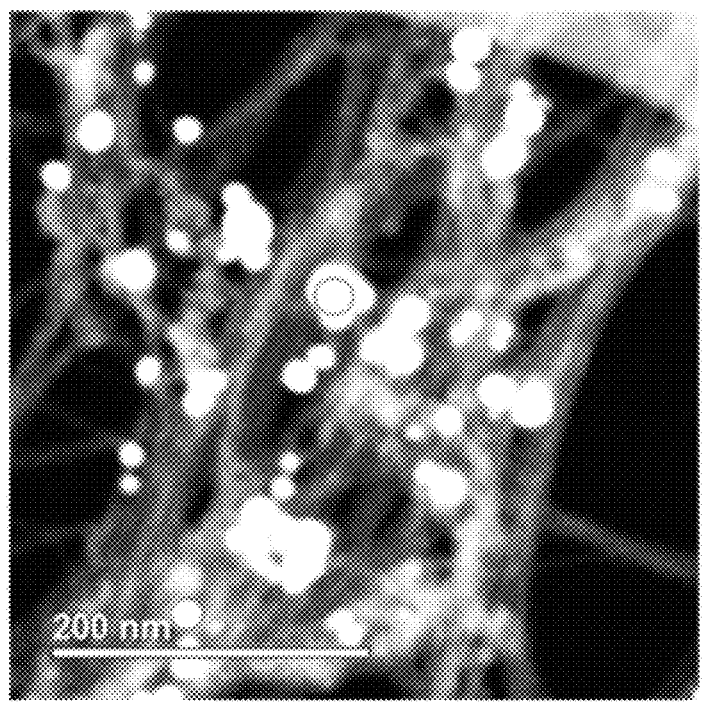
FIGS. 9A-9D show EDS (Energy dispersive X-ray) analysis of as-synthesized CNT samples.
Figure 9B:
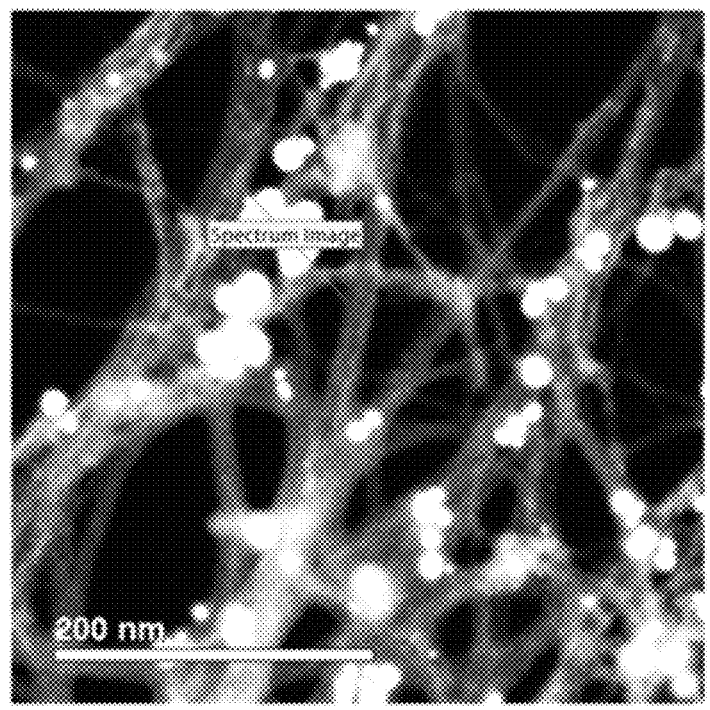
Figure 9C:
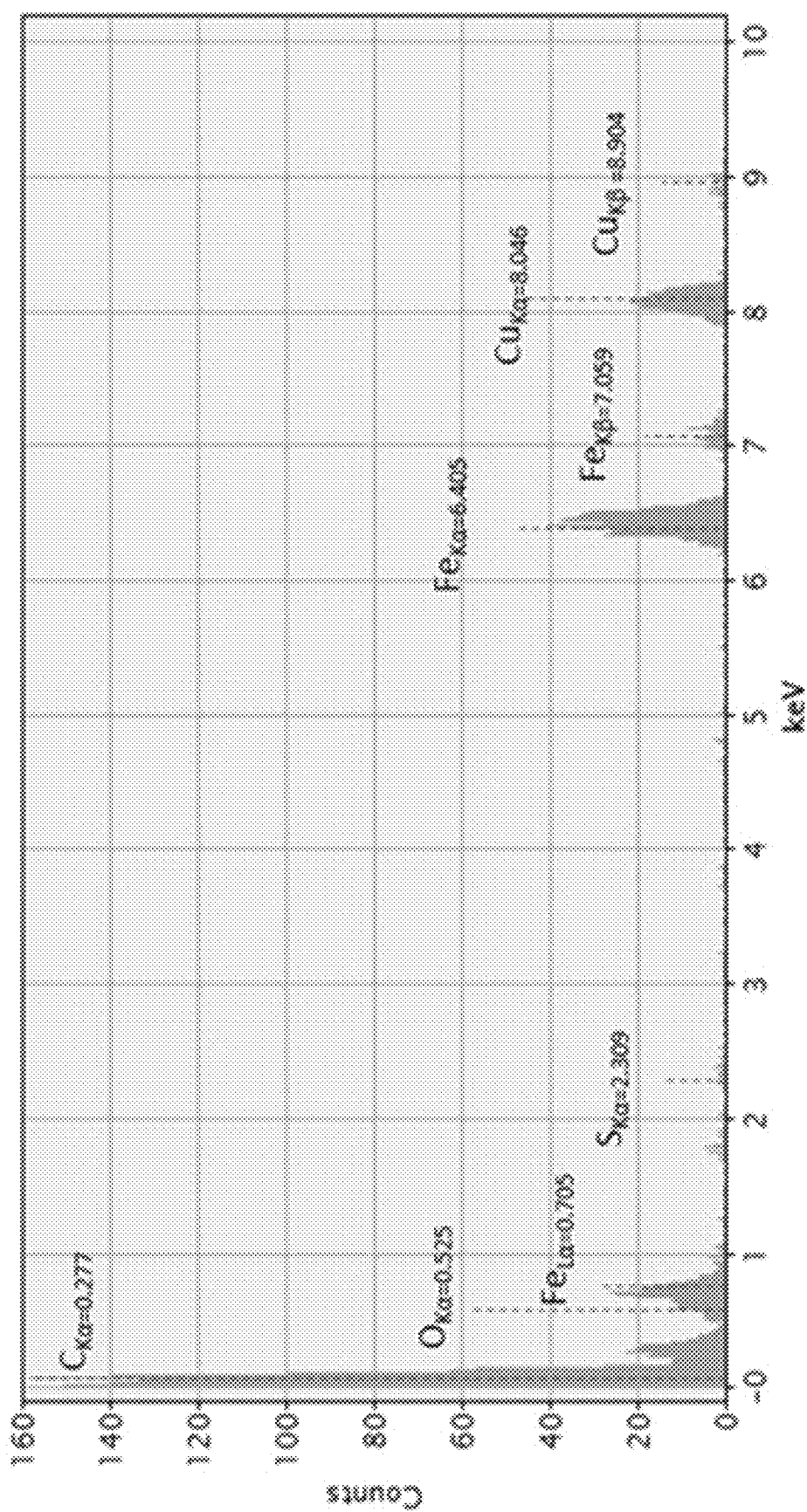
Figure 9D:
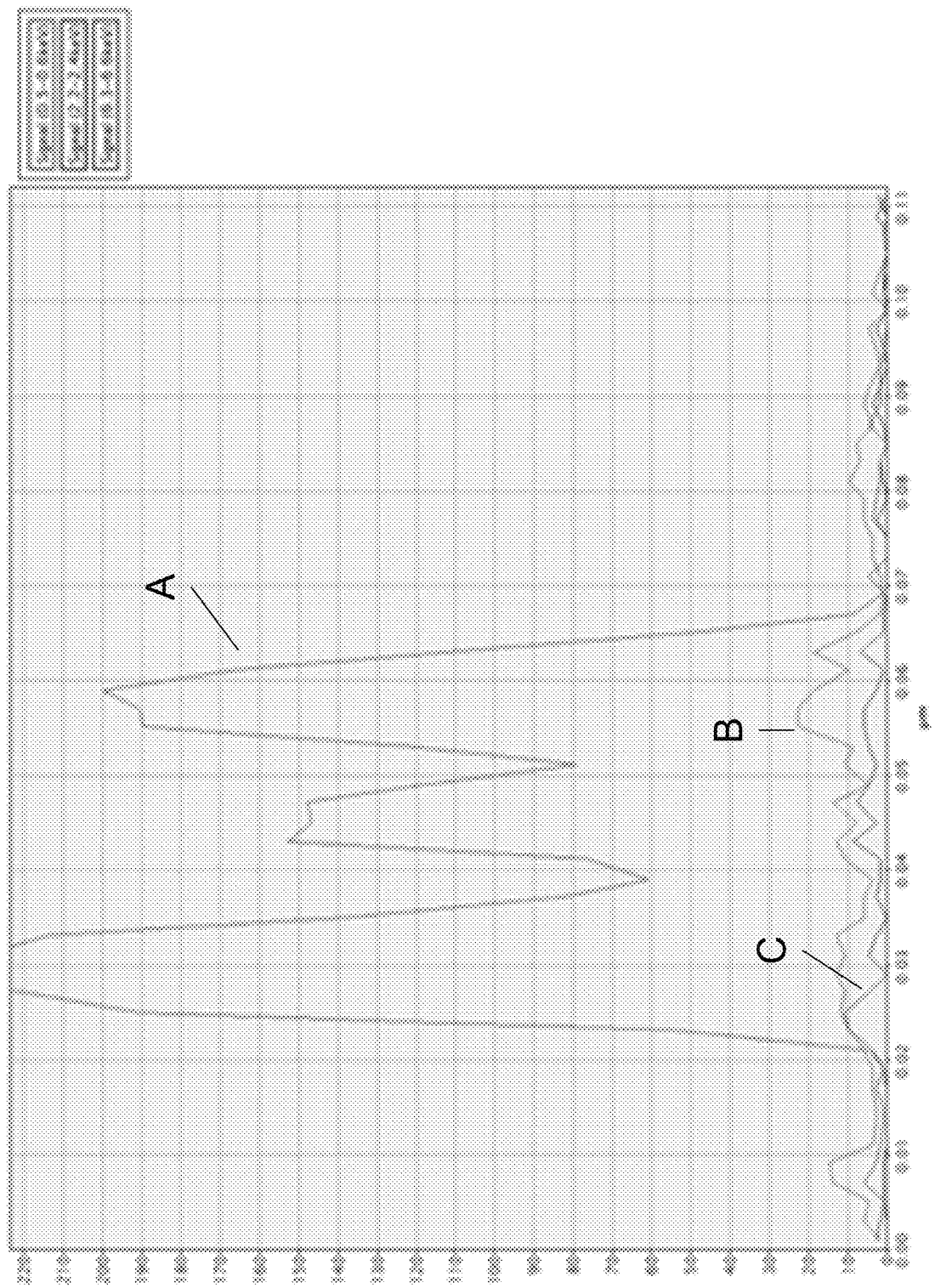
Figure 10:
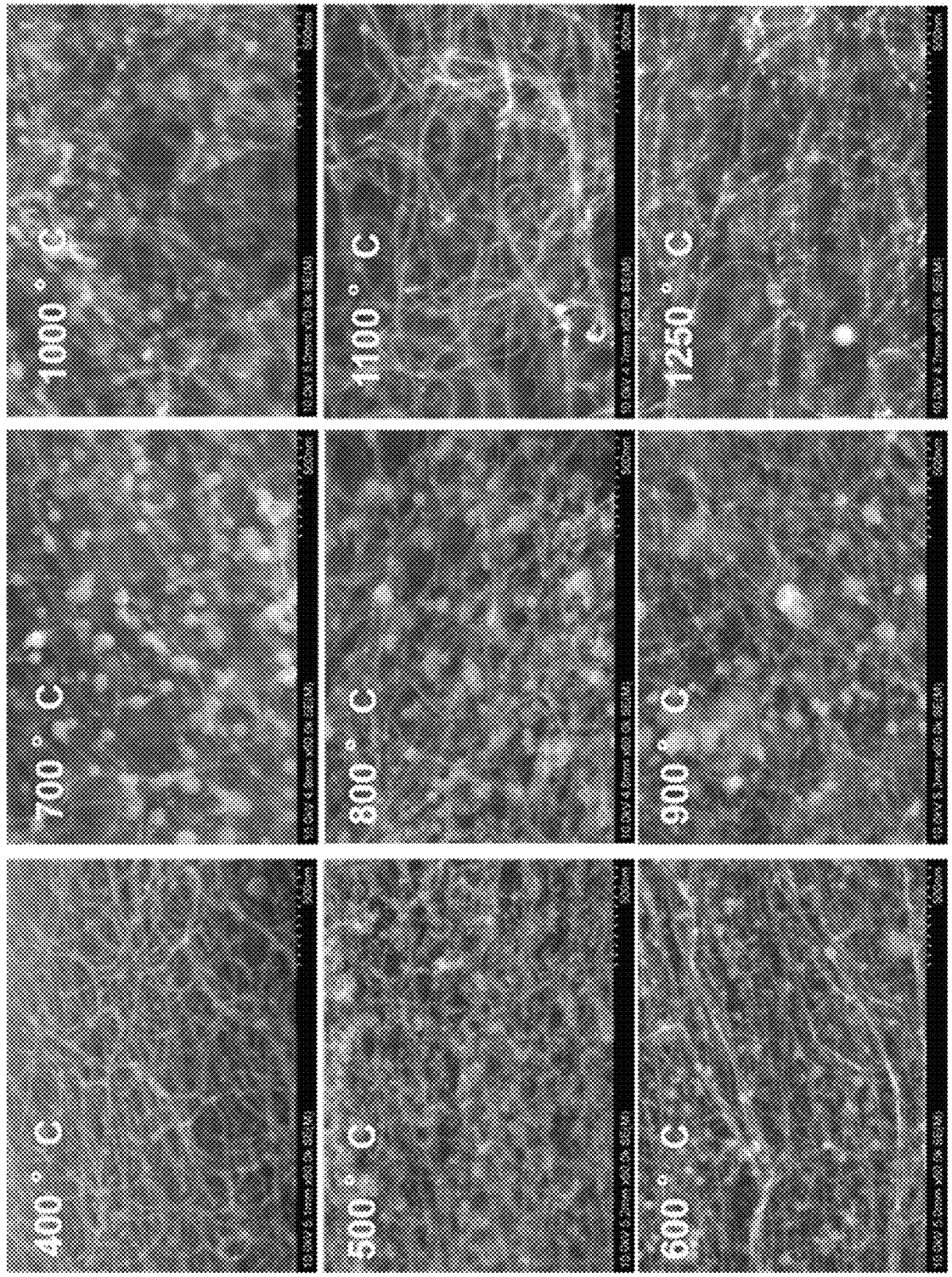
FIG. 10 shows SEM images of the transformation of the particle size in the CNT product produced under different upper-stream zone temperatures of the three-zoned furnace and without the convergent flow nozzle. The temperature of the first zone was varied in order to vary the nucleation temperature. The temperature of the second and third zone remained constant at 1250° C. All other experimental conditions were held constant.

The carbon nanotube reactor system includes an MTI three-zone tubular furnace (OTF-1500X—III-UL), replaceable quartz tubes (1.3/1.5 inch ID/OD), a movable nozzle, a set of concentric alumina tubes, and a Bronkhorst controlled evaporation mixing (CEM) vapor delivery system enabling the total evaporation and mixing of the precursors before delivery to the furnace (FIGS. 6 and 7). The MTI furnace has a total heating zone length of 600 mm and works continuously at 1250° C. with fluctuations of less than ±2° C. The nozzle cavity works as a catalyst nucleation zone in which the reagents can be compressed via the reduced inner diameter of the nozzles. The nozzle's temperature profile can also be adjusted by moving the nozzle along the furnace. The longitudinal temperature profile of the furnace was measured with varying positions of nozzle and setting temperatures by inserting an Omega 48-inch N-type thermocouple into the furnace (FIG. 8). This system was designed to operate at 1 atm with an outlet open for continuous CNT production and sample collection that makes it a high throughput process for screening parameters for CNT synthesis. Ethanol (anhydrous, Sigma Aldrich) was used as the main carbon feedstock, ferrocene (98%, Sigma Aldrich) as catalyst precursor, methanol (anhydrous, Sigma Aldrich) as the solvent and a mild etchant, nitrogen as the carrier gas, and thiophene ((99.9%, Sigma Aldrich) as the promoter for CNT growth. Additionally, toluene (99%, Sigma Aldrich) was applied to spike the carbon concentration in the nozzle. The solution mixture was introduced along with nitrogen gas into the CEM, where they are at 200° C. and before injection into the furnace. The gas delivery line was heated and maintained at 160° C. using a heating wrap to avoid condensation. The synthesized CNT samples were evaluated by scanning electron microscopy (SEM, Hitachi SU-70 FEG), EDS, TEM (JEOL JEM 2100 LaB6), AFM (Asylum MFP 3D), TGA (TGA/DSC 2, Mettler Toledo), and Raman spectrum (H-J-Y Raman microscope).

Turning now to FIG. 7, a schematic of the CEM system is illustrated. The CEM is composed of two flow lines: a gas flow and a liquid flow. The gas flow is composed of N2 gas, which splits into two ways. One gas flow goes through the CEM (red box) and into the reactor directly. The second gas flow goes to the liquid sample chamber and acts as a carrier gas for the solution. The liquid flow moves from the sample chamber into the CEM and gets mixed and vaporized inside before reaching the reactor.

In some experiments, both the syringe pump and CEM sample chamber were used to deliver solvents/solutions. The syringe pump was used to deliver EtOH while the CEM was used to deliver the ferrocene solution (composed of ferrocene dissolved in a mixture of thiophene, toluene, and MeOH). In other experiments, the CEM was the main way to introduce the liquid solution.

To magnify the influence of catalyst nucleation on the CNT sample morphology, a series of CNT samples were synthesized with a very low C/Fe ratio of 80 and a liquid injection rate of 0.2 ml/min and then characterized them using transmission electron microscopy (TEM) (FIGS. 2A-2F). Given the low C/Fe condition (and the injection rate) a higher density of the catalyst impurities might be expected. In the absence of toluene, a high number density of catalytic particles was observed, with relatively few nanotubes, and a broad size distribution of the metal impurities (FIG. 2A), indicating that a large portion of the catalytic iron nanoparticles has grown oversized or coalesced during the CVD process.

[ferrocene]–@T,P=[Fe]+[C5H5]

[C2H5OH]–@T,P=[C2H4]+[H2O]=[C]+[H2]+ [H2O]

Figure 17:
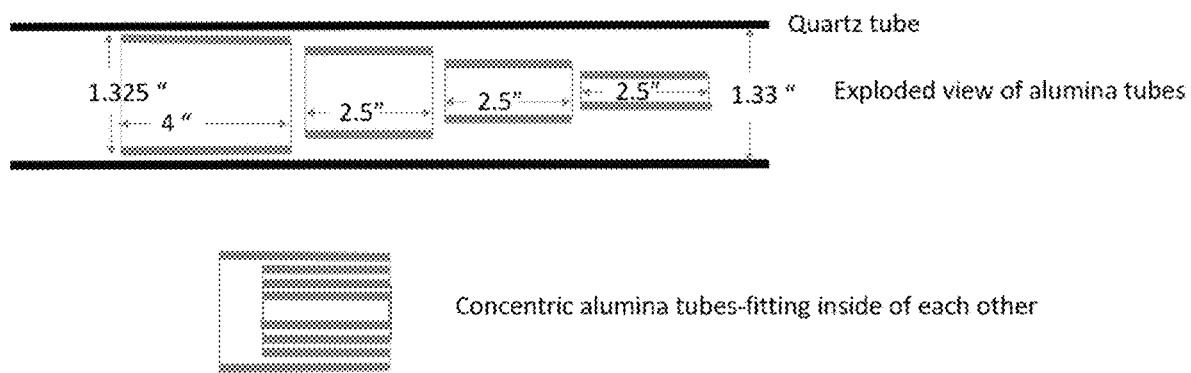
FIG. 17 is a schematic diagram showing concentric alumina tubes used to guide the vapor flow into the graphite nozzle and to prevent the loss of thermal radiation from inside the reactor tube, in accordance with one embodiment of the present disclosure. The alumina tubes are shown in an exploded view (top) and an assembled view (bottom).
Figure 18:
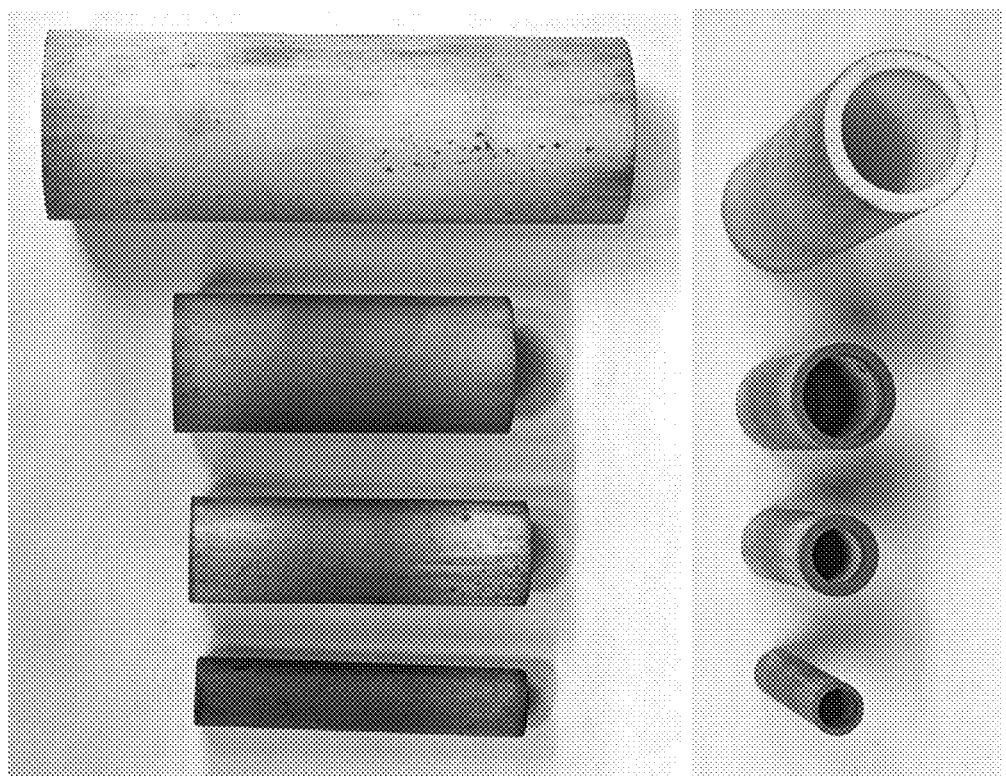
FIG. 18 shows photographs of the alumina tubes of FIG. 17.
Figure 19:
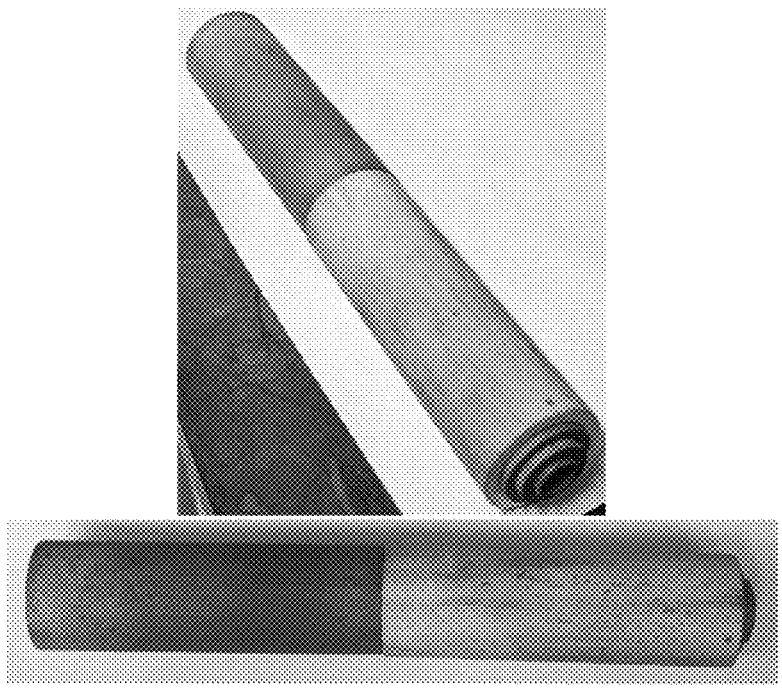
FIG. 19 shows the alumina tubes of FIG. 18 assembled into a concentric heat shielding device for the nozzle assembly.
Figure 20:
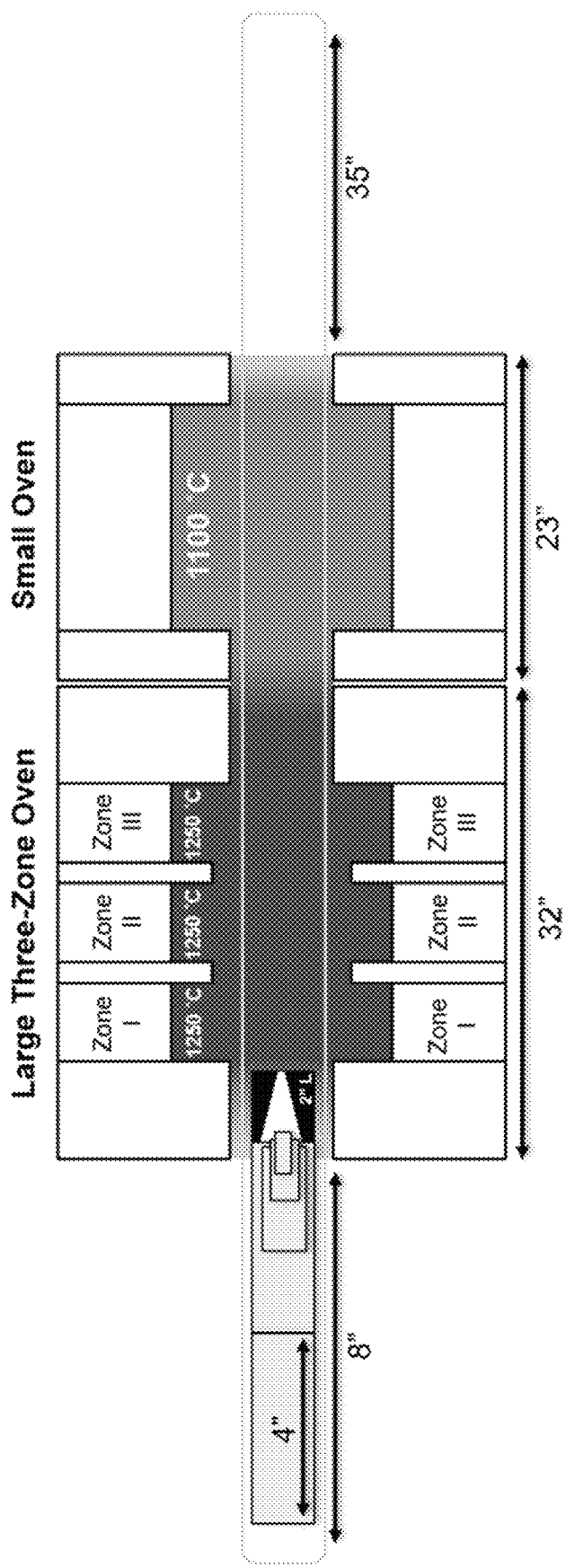
FIG. 20 shows a schematic of a carbon nanotube reactor.
Figure 21:
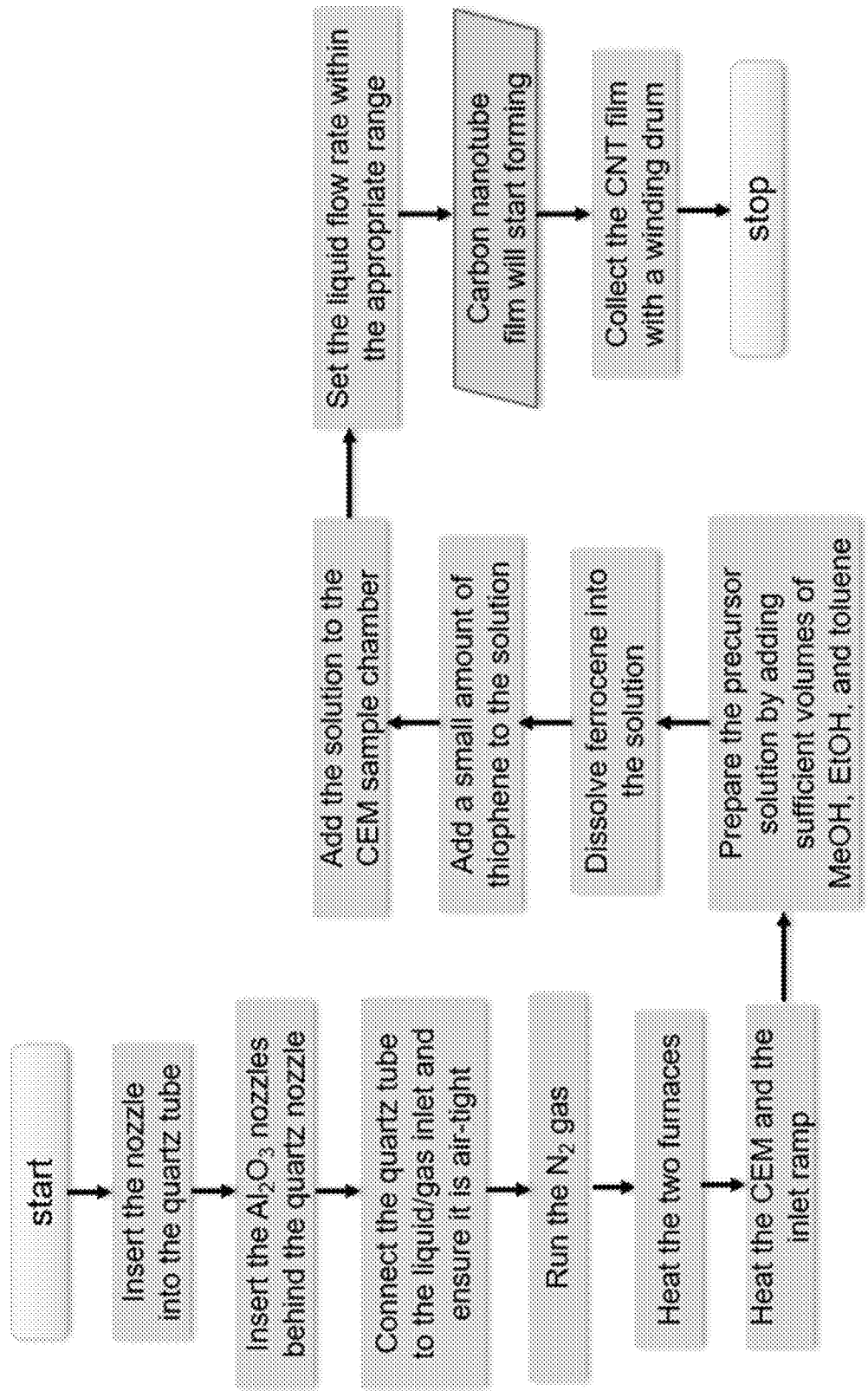
FIG. 21 shows a flow chart of a method of making carbon nanotubes.

Both size and number density of the catalyst impurities have been reduced (as mentioned above) in the CNT sample synthesized with 50% of the carbon from ethanol being substituted by toluene while maintaining the same C/Fe ratio. Both n-hexane and heptane were tested to replace toluene as the carbon feedstock with all the other experimental conditions being identical, and the production rate rapidly dropped from −0.35 mg/min to less than 0.03 mg/min. The effect of toluene was further demonstrated by the decreased catalyst efficiency as both n-hexane and heptane have a much lower decomposition rate. To control the nucleation and growth (as well as possible coalescence) of the catalyst nanoparticles, a nozzle assembly was developed comprising a graphite nozzle and four concentric alumina tubes (FIGS. 17-19) to create a concentration spike of both Fe and C within the nozzle (FIGS. 2C and 8). The nucleation efficiency increases as a function of the compression ratio by the nozzle (estimated from $(d_{reactor\ tube}/d_{orifice})^2$) and the flow rate (of 1.5 ml/min) (FIGS. 3A-3H).

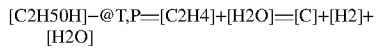

$$[C] \propto r \times \left(\frac{d_2}{d_1}\right)^2$$

The nozzle assembly also helped establish a sharp temperature increase, as shown in FIG. 8, due to the large difference in the thermal conductivity and infrared radiation absorption coefficient of graphite nozzles and alumina tube insulators. This temperature jump causes toluene to decompose making active carbon species immediately available as the Fe catalyst grows from atoms to the appropriate size for CNT nucleation (0.5-2 nm diameter). Without wishing to be bound by theory, it is believed that the immediate available high concentration of active carbon prevents the iron catalyst from overgrowing. This hypothesis is supported by control experiments in which toluene or nozzle was missing or the nozzle was positioned at an incorrect temperature zone.

A CNT sample was synthesized with the nozzle assembly by applying identical experimental conditions. The significantly decreased number density of the catalyst indicates an improved catalyst efficiency. FIG. 2D has shown the diameter distribution of the catalyst impurities of samples in FIGS. 2A-2C, correspondingly. The left shift of the diameter distribution can clearly demonstrate the size confinement of the catalyst nanoparticles, but the diameter distribution of the catalyst impurities is not fully representative of all the catalyst nanoparticles as hardly any CNTs can be observed growing on the catalyst impurities with TEM. Accordingly, it may be assumed that the number density of the smaller nanoparticles that actually catalyzed the CNT growth is much lower than the ones that do not because the long CNTs dissociated and diluted the actual catalyst nanoparticles under the vision of the microscope.

Figure 4A:
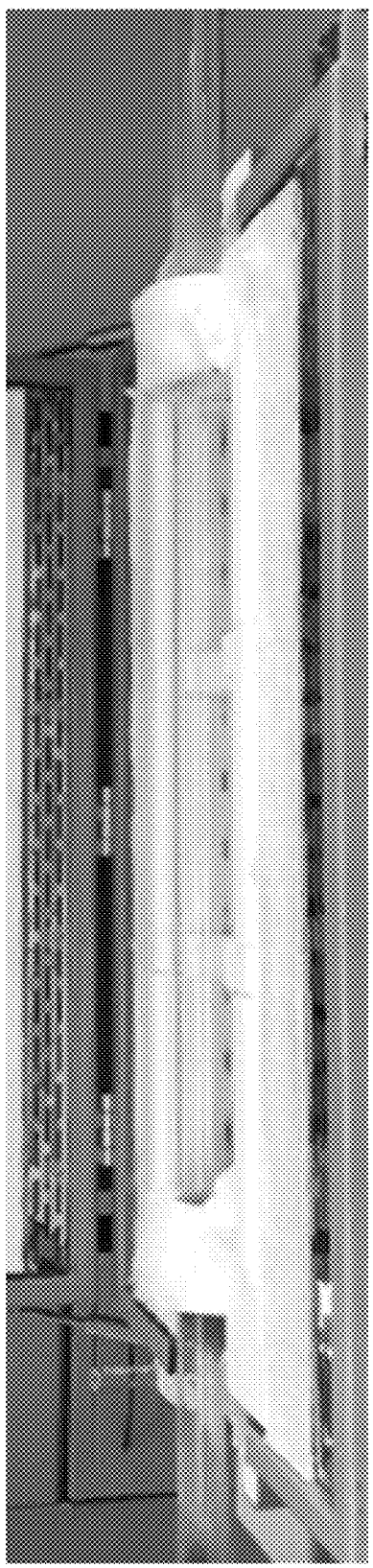
FIG. 4A is a photo of the reactor after a CNT growth experiment using pure methanol as carbon feedstock.
Figure 4B:
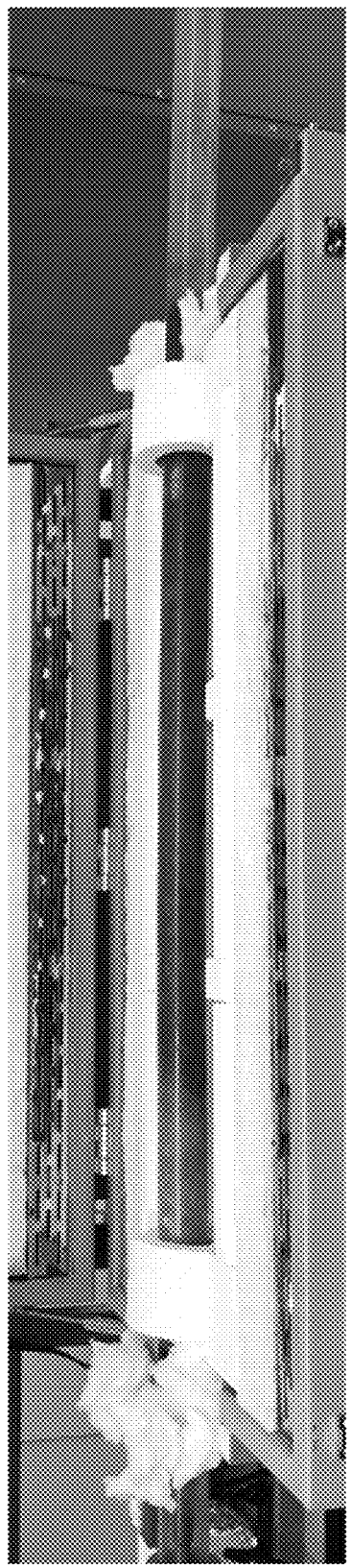
FIG. 4B is a photo of the reactor after a CNT growth experiment using 10 vol % ethanol and 90 vol % methanol as carbon feedstock.
Figure 4C:
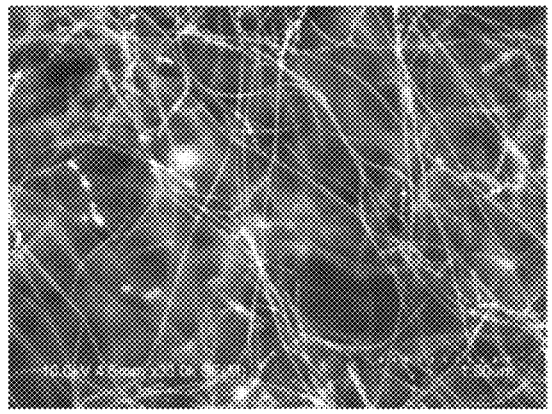
FIGS. 4C-4E show SEM images of CNT synthesized with the same injection rate and partial pressure of ferrocene, thiophene, toluene, and ethanol but with varied partial pressure of methanol with scale bars shown.
Figure 4D:
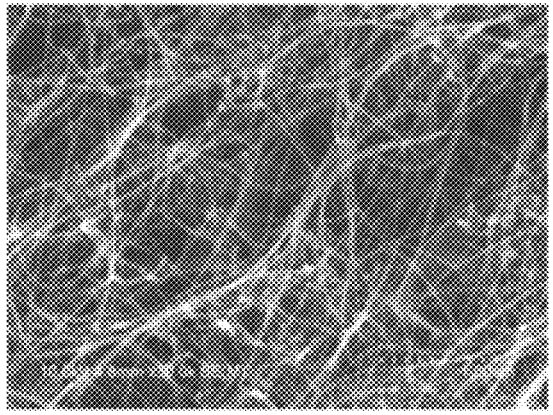
Figure 4E:
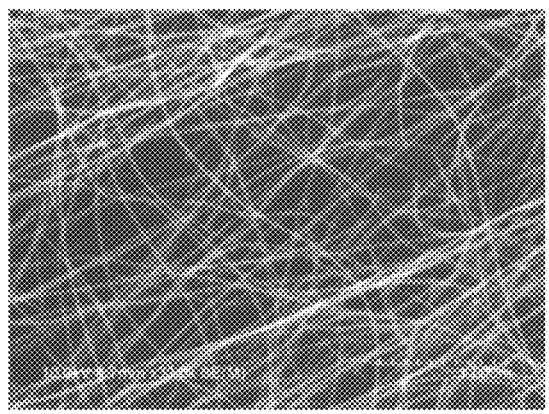
Figure 4F:
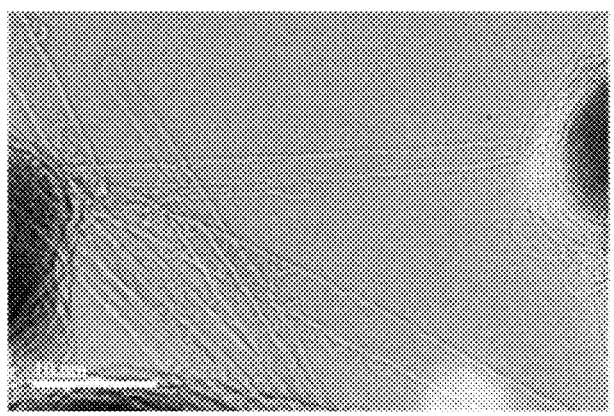
FIGS. 4F-4H show TEM images, with scale bars shown, corresponding to the CNT samples in FIGS. 4C-4E, respectively, showing a transition of the increased number of walls with the decreased partial pressure of methanol.
Figure 4G:
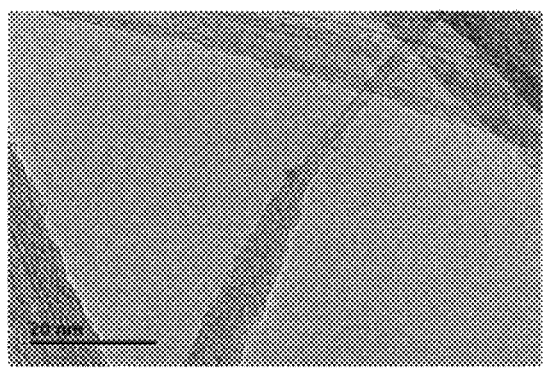
Figure 4H:
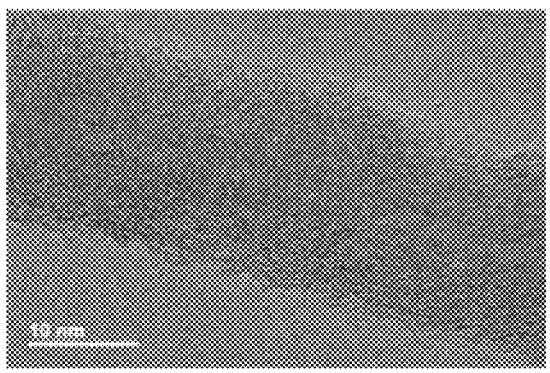
Figure 11:
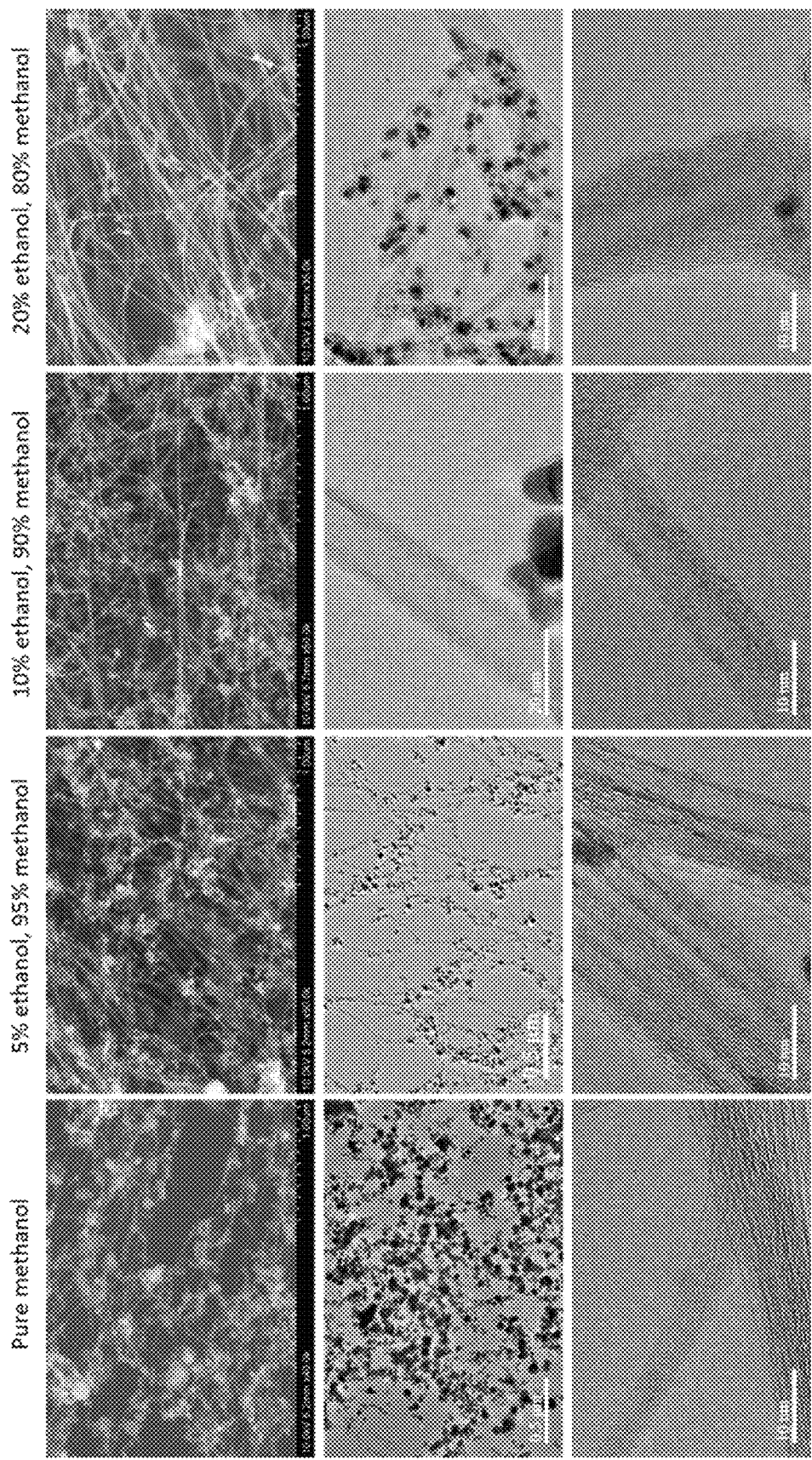
FIG. 11 shows carbon nanotubes synthesized by different ethanol to methanol ratios. The SEM and TEM shows the number and size of catalyst particles are significantly reduced, but the appearance of amorphous carbon coating on CNTs becomes more dominant with increased ethanol to methanol ratios.
Figure 12:
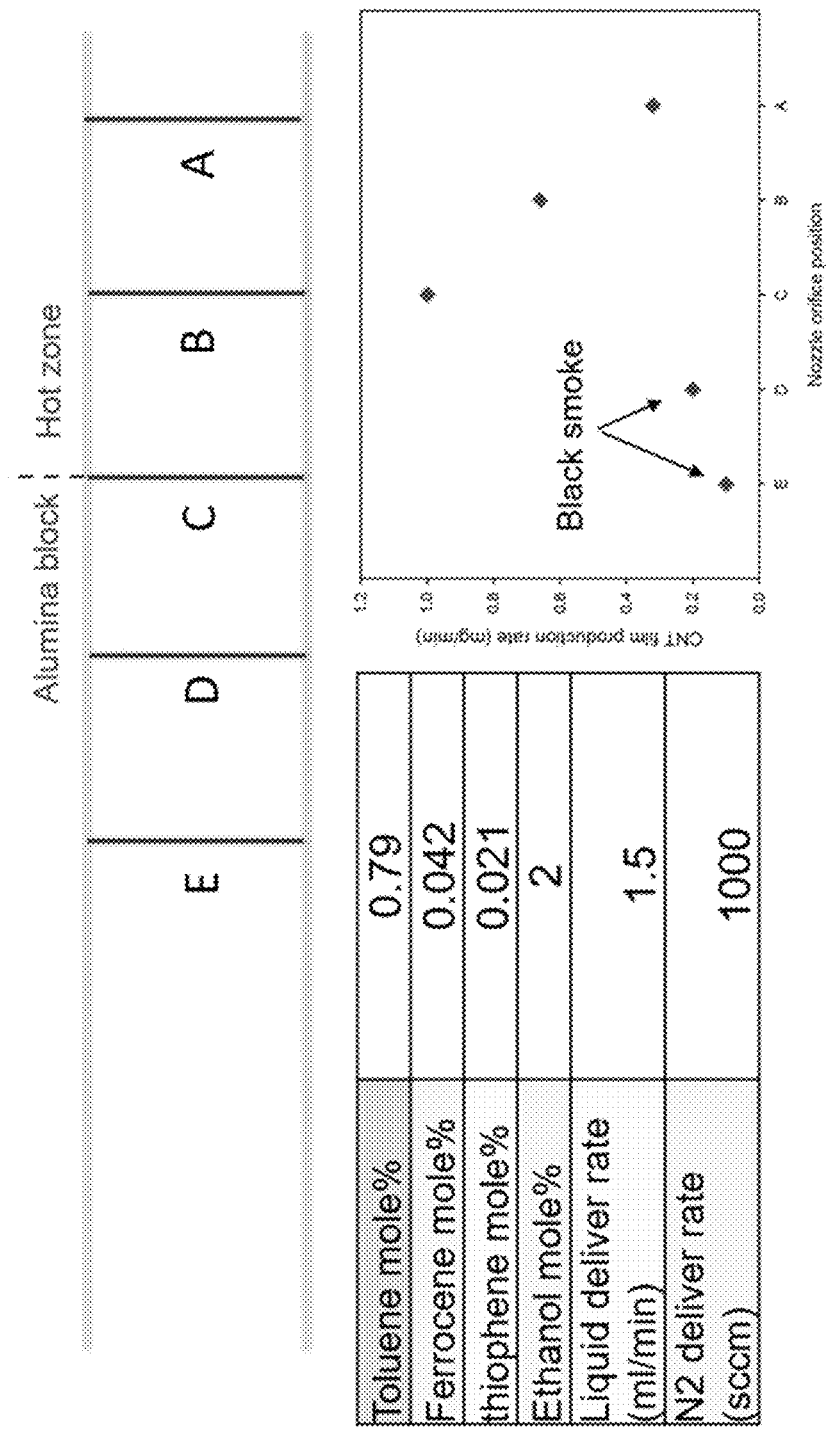
FIG. 12 illustrates the effect of moving the position of the nozzle in the quartz tube.

Methanol, which is known to produce OH radicals at high temperature, was used as the etchant to adjust the growth/etching balance of the CNTs in an open system (FIGS. 4A-4H and 11). FIG. 4A shows the appearance of the reactor tube after an experiment with ferrocene and methanol as the catalyst precursor and carbon feedstock. CNT web was formed with a very low production rate of less than ~0.01 mg min$^{-1}$, and the inner wall of the quartz tube is clear (FIGS. 4A and 11). Another control experiment was conducted by substituting 10 vol % of the methanol with ethanol. Continuous CNT web mixed with light black smokes was formed and carried out of the reactor with a near 20-fold increase of the production rate, and the inner wall of the hot zone was darkened with amorphous carbon indicating the growth/etching balance had shifted (FIGS. 4B and 11). A series of experiments were conducted with the same total injection rate of 0.2 ml·min$^{-1}$, identical partial pressure of ferrocene, thiophene, toluene, and ethanol but different concentration of methanol. An evident trend of increased production rate and number of walls of the CNTs can be observed with SEM and TEM (FIGS. 4C-4H). In FIG. 4G, the transition from a double-walled to a multi-walled CNT was spotted on the same carbon nanotube with the outer walls being polycrystalline with a discontinuous structure. This observation indicates different growth mechanisms between the core CNT layers and the outer shells of the as-synthesized multi-walled CNTs. The inner layers were synthesized following the bottom-tip growth mechanism, where CNTs were formed and prolonged continuously on the surface of the catalyst. In contrast, the outer layer was grown directly on the outer wall of the inner layer CNT with the sp2 lattice of the inner CNT as a growth template. This phenomenon revealed the behavior of the active carbon species with or without contact with the catalyst surface. With the overall specific area of the nanoparticles also determined based on their size distribution, it is beneficial to control the nucleation of the catalyst to achieve high-quality, single-crystalline CNT samples.

Figure 5A:
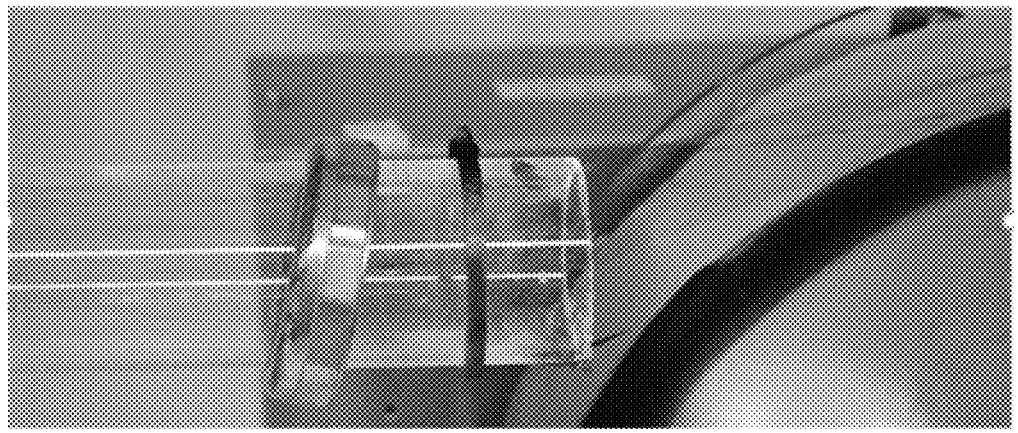
FIGS. 5A-5H show continuous synthesis of high-quality single wall carbon nanotubes (SWCNTs).
Figure 5B:
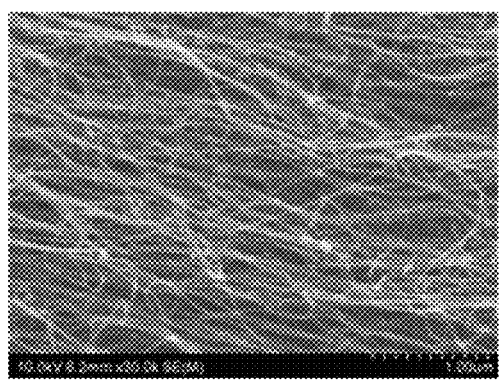
Figure 5C:
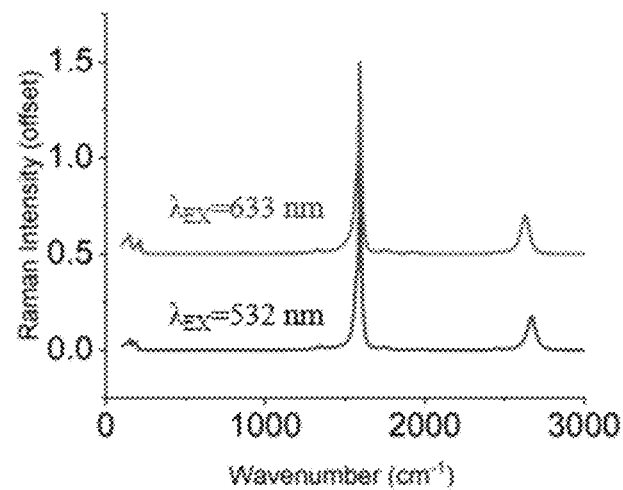
Figure 5D:
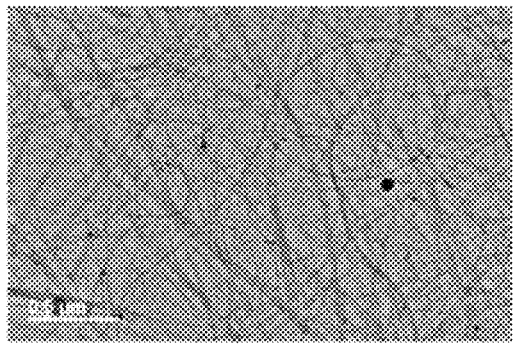
Figure 5E:
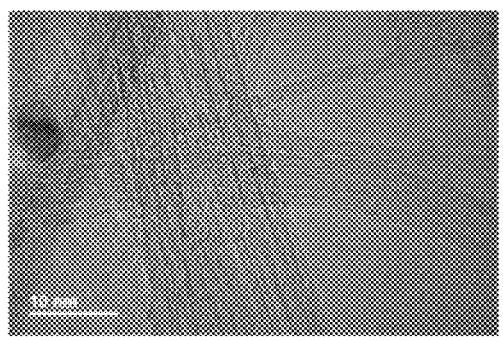
Figure 5F:
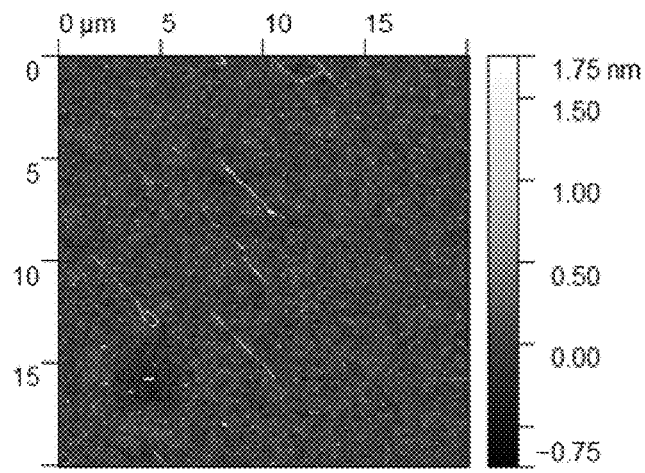
Figure 5G:
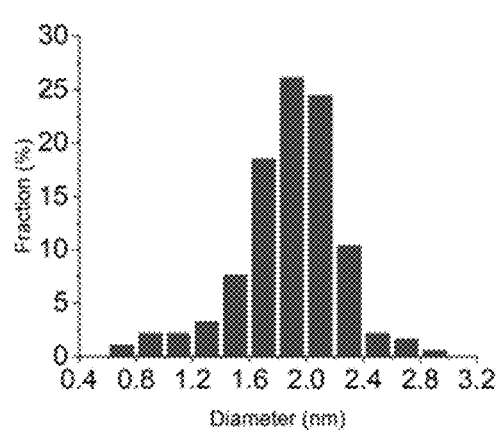
Figure 5H:
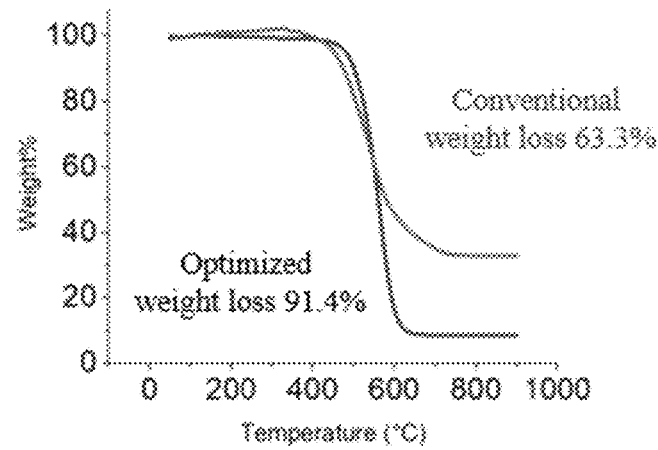

Linear production speeds as high as 1400 m/min may be achieved via the disclosed systems and methods, as compared with previously known high speeds of 600 m/min. The sample was further examined using thermogravimetric analysis (TGA) in air, which shows a weight loss as high as 91.4% corresponding to >98.6 at % carbon purity (FIG. 5H). AFM measurements show that most of the CNTs are longer than 3 μm, and the cross-section profile indicates a CNT diameter of about 0.6-2.1 nm, which is consistent with Raman scattering and TEM (FIG. 5F).

REFERENCES

The documents listed below and referenced herein are incorporated herein by reference in their entireties, except for any statements contradictory to the express disclosure herein, subject matter disclaimers or disavowals, and except to the extent that the incorporated material is inconsistent with the express disclosure herein, in which case the language in this disclosure controls. Incorporation by reference of the following shall not be considered an admission by the applicant that the incorporated materials are prior art to the present disclosure, or considered to be material to the patentability of the present disclosure.

1 Yu, M.-F. et al. Strength and breaking mechanism of multiwalled carbon nanotubes under tensile load. *Science* 287, 637-640 (2000).
2 Pan, Z. et al. Tensile tests of ropes of very long aligned multiwall carbon nanotubes. *Applied Physics Letters* 74, 3152-3154 (1999).
3 Pop, E., Mann, D., Wang, Q., Goodson, K. & Dai, H. Thermal conductance of an individual single-wall carbon nanotube above room temperature. *Nano Letters* 6, 96-100 (2006).
4 Bachilo, S. M. et al. Structure-assigned optical spectra of single-walled carbon nanotubes. *Science* 298, 2361-2366 (2002).
5 Huang, J., Zhang, Q., Zhao, M. & Wei, F. A review of the large-scale production of carbon nanotubes: The practice of nanoscale process engineering. *Chinese Science Bulletin* 57, 157-166 (2012).
6 Chitranshi, M. et al. Carbon Nanotube Sheet-Synthesis and Applications. *Nanomaterials* 10, 2023 (2020).
7 Zhang, R., Zhang, Y. & Wei, F. Controlled synthesis of ultralong carbon nanotubes with perfect structures and extraordinary properties. Accounts of chemical research 50, 179-189 (2017).
8 Rao, R. et al. Carbon nanotubes and related nanomaterials: critical advances and challenges for synthesis toward mainstream commercial applications. *ACS nano* 12, 11756-11784 (2018).
9 Jiang, K. et al. Superaligned carbon nanotube arrays, films, and yarns: a road to applications. *Advanced Materials* 23, 1154-1161 (2011).
10 Li, Y.-L., Kinloch, I. A. & Windle, A. H. Direct Spinning of Carbon Nanotube Fibers from Chemical Vapor Deposition Synthesis. *Science* 304, 276 (2004).
11 Anoshkin, I. V. et al. Hybrid carbon source for single-walled carbon nanotube synthesis by aerosol CVD method. *Carbon* 78, 130-136 (2014).
12 Gspann, T. S., Smail, F. R. & Windle, A. H. Spinning of carbon nanotube fibres using the floating catalyst high temperature route: purity issues and the critical role of sulphur. *Faraday Discuss.* 173, 47-65 (2014).
13 Paukner, C. & Koziol, K. K. K. Ultra-pure single wall carbon nanotube fibres continuously spun without promoter. *Scientific Reports* 4, 3903 (2015).
14 Hoecker, C., Smail, F., Bajada, M., Pick, M. & Boies, A. Catalyst nanoparticle growth dynamics and their influence on product morphology in a CVD process for continuous carbon nanotube synthesis. *Carbon* 96, 116-124 (2016).
15 Lee, S.-H. et al. Synthesis of carbon nanotube fibers using the direct spinning process based on Design of Experiment (DOE). *Carbon* 100, 647-655 (2016).
16 Ma, Y., Dichiara, A. B., He, D., Zimmer, L. & Bai, J. Control of product nature and morphology by adjusting the hydrogen content in a continuous chemical vapor deposition process for carbon nanotube synthesis. *Carbon* 107, 171-179 (2016).
17 Mikhalchan, A. et al. Continuous and scalable fabrication and multifunctional properties of carbon nanotube aerogels from the floating catalyst method. *Carbon* 102, 409-418 (2016).
18 Hoecker, C., Smail, F., Pick, M. & Boies, A. The influence of carbon source and catalyst nanoparticles on CVD synthesis of CNT aerogel. *Chemical Engineering Journal* 314, 388-395 (2017).
19 Wang, B.-W. et al. Continuous Fabrication of Meter-Scale Single-Wall Carbon Nanotube Films and their Use in Flexible and Transparent Integrated Circuits. *Advanced Materials* 30, 1802057 (2018).
20 Kaniyoor, A. et al. High throughput production of single-wall carbon nanotube fibres independent of sulfur-source. *Nanoscale* 11, 18483-18495 (2019).
21 Zhang, Q., Wei, N., Laiho, P. & Kauppinen, E. I. in *Single-Walled Carbon Nanotubes* 99-128 (Springer, 2019).
22 Park, J. H., Park, J., Lee, S.-H. & Kim, S. M. Continuous synthesis of high-crystalline carbon nanotubes by controlling the configuration of the injection part in the floating catalyst chemical vapor deposition process. *Carbon Letters* 30, 613-619 (2020).
23 Zhang, Q. et al. Transparent and Freestanding Single-Walled Carbon Nanotube Films Synthesized Directly and Continuously via a Blown Aerosol Technique. *Advanced Materials*, 2004277 (2020).
24 Lee, S.-H. et al. Deep-injection floating-catalyst chemical vapor deposition to continuously synthesize carbon nanotubes with high aspect ratio and high crystallinity. *Carbon* 173, 901-909 (2021).
25 Fulem, M. et al. Recommended vapor pressure and thermophysical data for ferrocene. *The Journal of Chemical Thermodynamics* 57, 530-540 (2013).
26 Bhattacharjee, A., Rooj, A., Roy, D. & Roy, M. Thermal Decomposition Study of Ferrocene [(C 5 H 5) 2 Fe]. *Journal of Experimental Physics* 2014, 1-8 (2014).
27 Astruc, D. Why is Ferrocene so Exceptional?: Why is Ferrocene so Exceptional? *European Journal of Inorganic Chemistry* 2017, 6-29 (2017).
28 Girshick, S. L. & Chiu, C. P. Kinetic nucleation theory: A new expression for the rate of homogeneous nucleation from an ideal supersaturated vapor. *The Journal of Chemical Physics* 93, 1273-1277 (1990).
29 Xiong, Y. & Pratsinis, S. Formation of irregular particles by coagulation and sintering a two-dimensional solution of the population balance equation. *Journal of Aerosol Science* 22, S199-S202 (1991).
30 Koch, W. & Friedlander, S. The effect of particle coalescence on the surface area of a coagulating aerosol. *Journal of Colloid and Interface Science* 140, 419-427 (1990).
31 Johns, I., McElhill, E. & Smith, J. Thermal Stability of Some Organic Compounds. *Journal of Chemical and Engineering Data* 7, 277-281 (1962).
32 Wall, L. A. *The Mechanisms of Pyrolysis, Oxidation, and Burning of Organic Materials: Based on Invited Papers and Discussion*. Vol. 357 (National Bureau of Standards, 1972).
33 Li, J., Kazakov, A. & Dryer, F. L. Experimental and numerical studies of ethanol decomposition reactions. *The Journal of Physical Chemistry A* 108, 7671-7680 (2004).
34 Pelech, I. & Narkiewicz, U. The Kinetics of Ethylene Decomposition on Iron Catalyst. *Acta Physica Polonica*, A. 116 (2009).
35 Luo, Y.-R. & Kerr, J. Bond dissociation energies. *CRC Handbook of Chemistry and Physics* 89, 89 (2012).

36 Lee, P.-F., Matsui, H., Xu, D.-W. & Wang, N.-S. Thermal Decomposition and Oxidation of CH 3 OH. *The Journal of Physical Chemistry A* 117, 525-534 (2013).

37 Zhang, L. et al. Growth termination and multiple nucleation of single-wall carbon nanotubes evidenced by in situ transmission electron microscopy. *ACS Nano* 11, 4483-4493 (2017).

38 Zhang, R., Khalizov, A., Wang, L., Hu, M. & Xu, W. Nucleation and growth of nanoparticles in the atmosphere. *Chemical Reviews* 112, 1957-2011 (2012).

39 Rinaldi, A. et al. Dissolved Carbon Controls the Initial Stages of Nanocarbon Growth. *Angewandte Chemie International Edition* 50, 3313-3317 (2011).

40 Mazzucco, S. et al. Direct evidence of active and inactive phases of Fe catalyst nanoparticles for carbon nanotube formation. *Journal of catalysis* 319, 54-60 (2014).

41 Magnin, Y., Zappelli, A., Amara, H., Ducastelle, F. & Bichara, C. Size dependent phase diagrams of nickel-carbon nanoparticles. *Physical Review Letters* 115, 205502 (2015).

42 Aguiar-Hualde, J.-M., Magnin, Y., Amara, H. & Bichara, C. Probing the role of carbon solubility in transition metal catalyzing single-walled carbon nanotubes growth. *Carbon* 120, 226-232 (2017).

43 Qi, Y. et al. Unique Transformation from Graphene to Carbide on Re(0001) Induced by Strong Carbon-Metal Interaction. *Journal of the American Chemical Society* 139, 17574-17581 (2017).

44 Dee, N. T. et al. Carbon-assisted catalyst pretreatment enables straightforward synthesis of high-density carbon nanotube forests. *Carbon* 153, 196-205 (2019).

45 Qi, H., Qian, C. & Liu, J. Synthesis of High-Purity Few-Walled Carbon Nanotubes from Ethanol/Methanol Mixture. Chemistry of Materials 18, 5691-5695 (2006).

46 Zender, C. (Citeseer, 2008).

47 Oehlschlaeger, M. A., Davidson, D. F. & Hanson, R. K. Thermal decomposition of toluene: Overall rate and branching ratio. *Proceedings of the Combustion Institute* 31, 211-219 (2007).

48 Ebert, K., Ederer, H. & Isbarn, G. The thermal decomposition of n-hexane. *International Journal of Chemical Kinetics* 15, 475-502 (1983).

49 Guan, Y., Lou, J., Liu, R., Ma, H. & Song, J. Reactive molecular dynamics simulation on thermal decomposition of n-heptane and methylcyclohexane initiated by nitroethane. *Fuel* 261, 116447 (2020).

Additional references incorporated by reference in this application in their entirety include the following:

Zhou, T. et al. The synergetic relationship between the length and orientation of carbon. Materials and Design 203, 109557 (2021).

Lee, J. et al. Direct spinning and densification method for high-performance carbon nanotube fibers. Nature Communications 10: 2962 (2019).

Tran, Q. T. et al. Purification and Dissolution of Carbon Nanotube Fibers Spun from the Floating Catalyst Method. ACS Applied Materials & Interfaces 9:37222-37119 (2017).

Reguero, V. et al. Controlling Carbon Nanotube Type in Macroscopic Fibers Synthesized by the Direct Spinning Process. Chemistry of Materials 26:3550-3557 (2014).

These references are incorporated by reference herein, at least in part, for details of methods employed to prepare carbon nanotubes and more specifically for methods of preparation of macroscopic forms comprising carbon nanotubes such as spinning.

Embodiments of the present disclosure can be further understood by the following non-limiting examples.

Example 2—Reactor Parameters

Table 1, below, shows process parameters for a 34 mm ID×38 mm OD×2500 long diameter tube reactor. Process parameters, such as flow rates, can be scaled approximately proportional to the reactor tube diameter.

TABLE 1

| Parameter | Range | Preferred Range |
|---|---|---|
| Furnace Temperature | 400-1500° C. | 1100-1250° C. |
| Liquid Flow rate | 0.1-10 ml/min | 1-1.5 ml/min |
| Carrier gas flow rate ($N_2$) | 200-2000 sccm | 900-1100 sccm |
| Methanol | 50-300 mL | 180-220 mL |
| Toluene | 0.1-6 mL | 3-4.5 mL |
| Ethanol | 0.1-8 mL | 5.5-6.5 mL |
| Ferrocene | 0.3-0.8 g | 0.4-0.5 mL |
| Thiophene | 0.012-0.049 mol % | 0.017-0.029 mol % |
| Ratio of graphite nozzle orifice diameter to reactor diameter (ID) | 6%-37% | 20%-30% |

Example 3—Toluene to Ferrocene Ratio

Figure 13A:
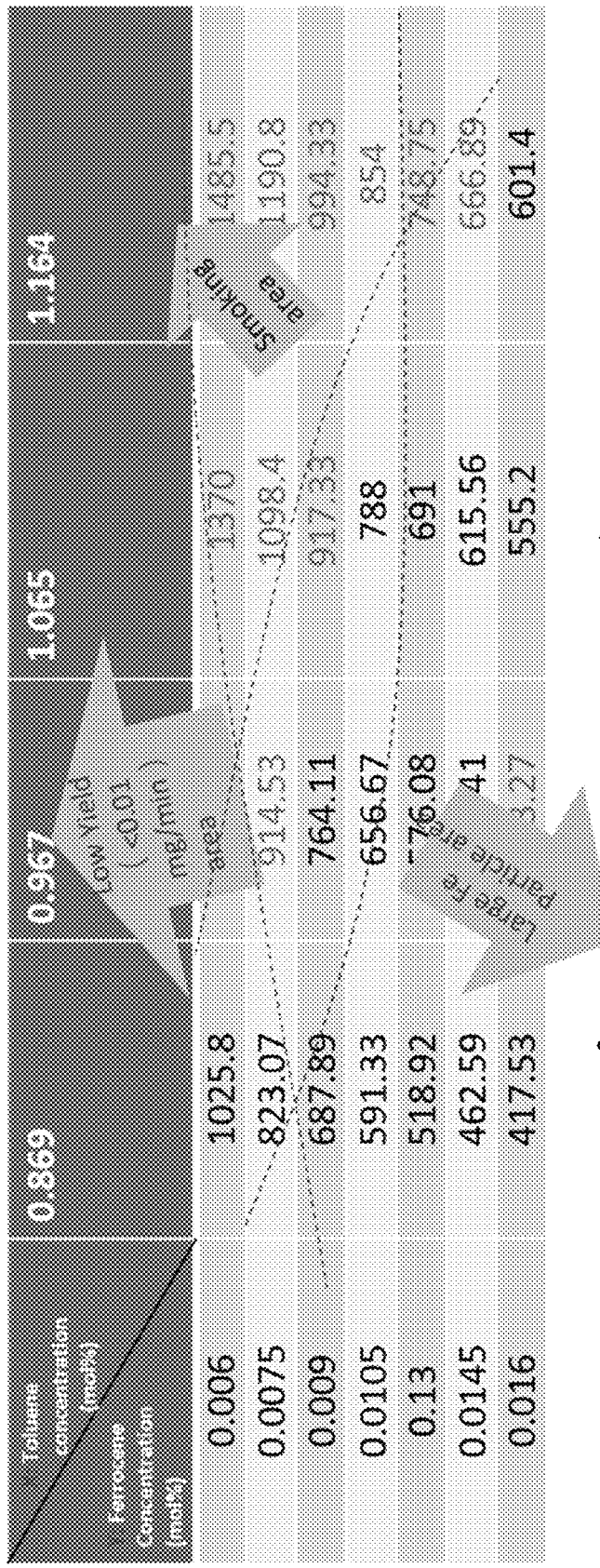
FIGS. 13A-13D shows the results of varying toluene:ferrocene ratio.
Figure 13D:
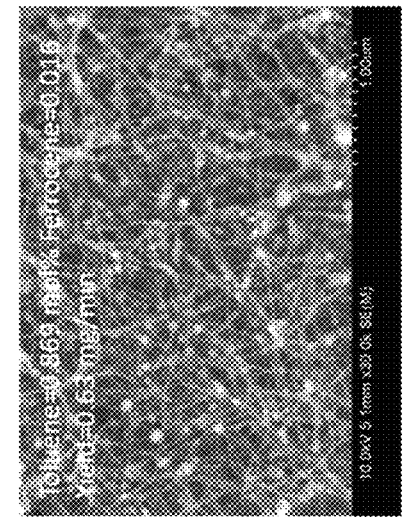
Figure 13C:
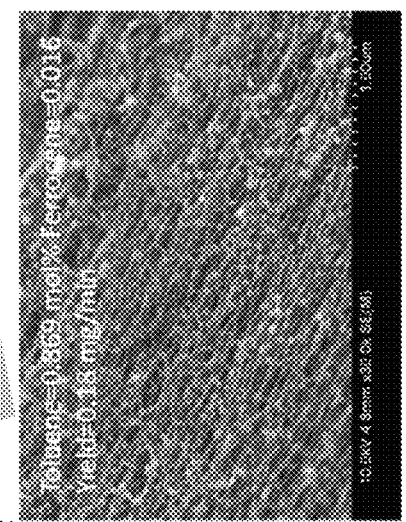
Figure 13B:
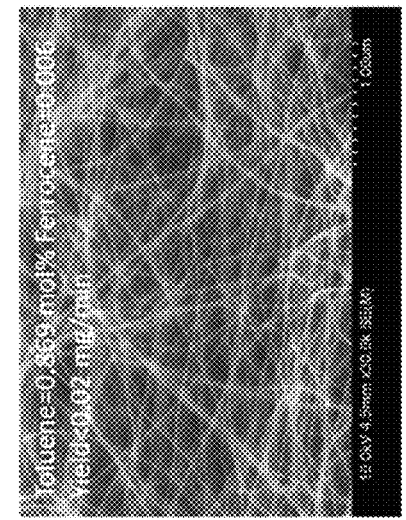
Figure 14:
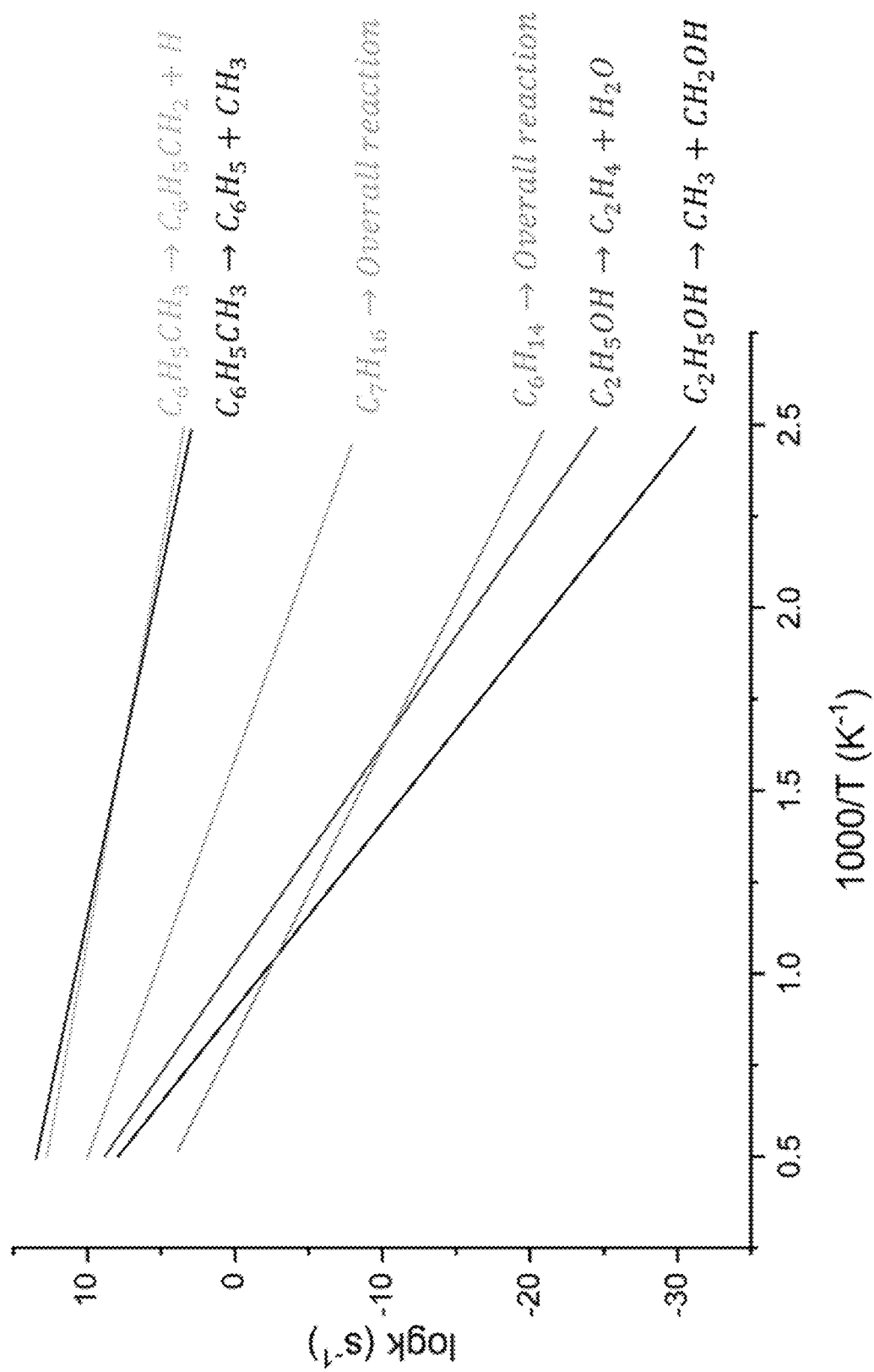
FIG. 14 shows an Arrhenius plot of the thermal decomposition rate of ethanol, toluene, n-hexane, and n-heptane. (Ferrocene nearly completely decomposes at 477° C.)
Figure 15:
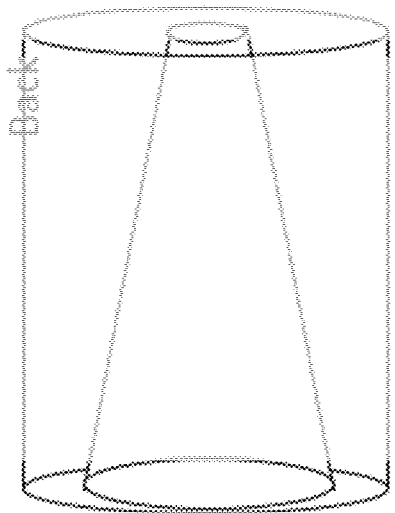
FIG. 15 shows a 3D representation (top) and a cross section (bottom) of a convergent flow nozzle of the present disclosure.
Figure 15:
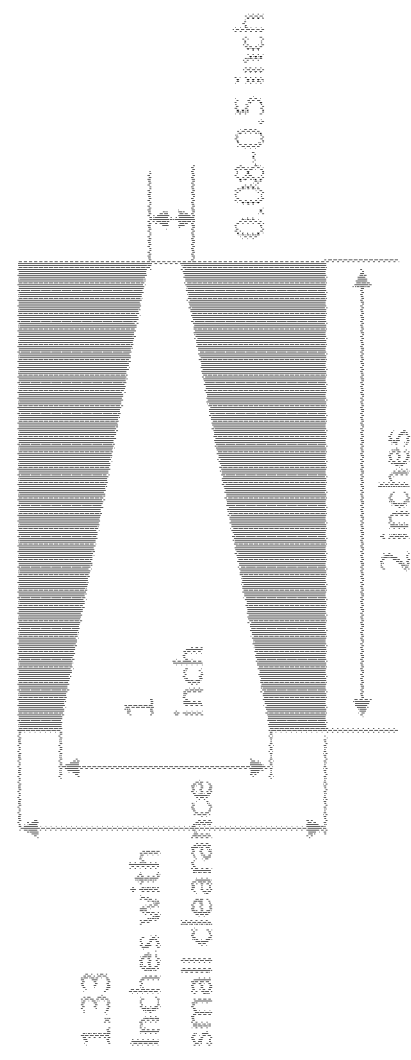
Figure 16:
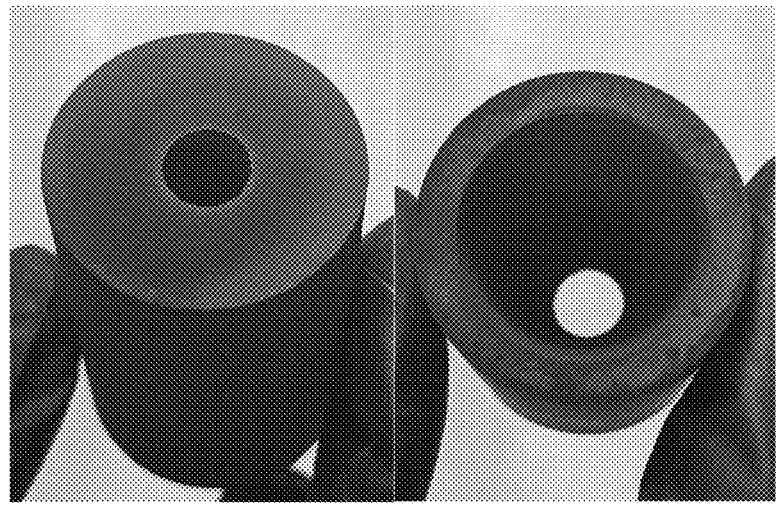
FIG. 16 shows photographs of the outlet (left) and inlet (right) of a convergent flow nozzle of the present disclosure.

Turning now to FIG. 13A, the toluene to ferrocene ratio was varied and the results were observed. The data within the table represents the C/Fe ratio so it has no units (C is calculated solely from toluene). In this set of experiments, the liquid was introduced into two parts: The syringe injection, and CEM injection The syringe injection contained a toluene in Methanol solution. The toluene concentration was measured in mol % relative to the total moles of the solution. Four different solutions were made with different concentrations of toluene (0.869-1.164 mol % in the $1^{st}$ row of the table in FIG. 13A) The syringe injection rate is 2 ml/min.

The CEM injection had a solution composed of Ferrocene (0.075 mol %) and thiophene (0.0375 mol %) in methanol. The final ferrocene concentration, (shown in the $1^{st}$ column of FIG. 13A) was calculated and varied based on the CEM injection rate with the following formula Final Ferrocene conc. (mol %) =

$$\text{Final Ferrocene conc. (mol \%)} = \frac{\text{Initial Ferroncene conc. (mol \%)} \times CEM \text{ injection rate}}{\text{Syringe Injection Rate}}$$

$$\text{Final Ferrocene conc. (mol \%)} = \frac{0.075 \text{ mol \%} \times CEM \text{ injection rate}}{2 \text{ ml/min}}$$

The CEM injection rate was varied between 0.16-0.4 ml/min (0.04 increments), which gave a ferrocene concentration of 0.006-0.016 mol %). Other conditions of this experiment include a Temperature of 1250° C. and a N2 flow rate of 1000 sccm.

Example 4—Ethanol Concentration Effect on CNT Morphology

The ethanol concentration was varied to observe the effect on CNT morphology. Experimental conditions were as follows: Toluene conc. (0.65 mol %), Ferrocene conc. (0.042 mol %), Thiophene conc. (0.021 mol %); CEM liquid flow rate: 1.5, N2 flow rate: 1000 sccm, large furnace T: 1250° C. (all three zones), small furnace: 1100° C., a nozzle orifice diameter: 0.35"

Figure 22:
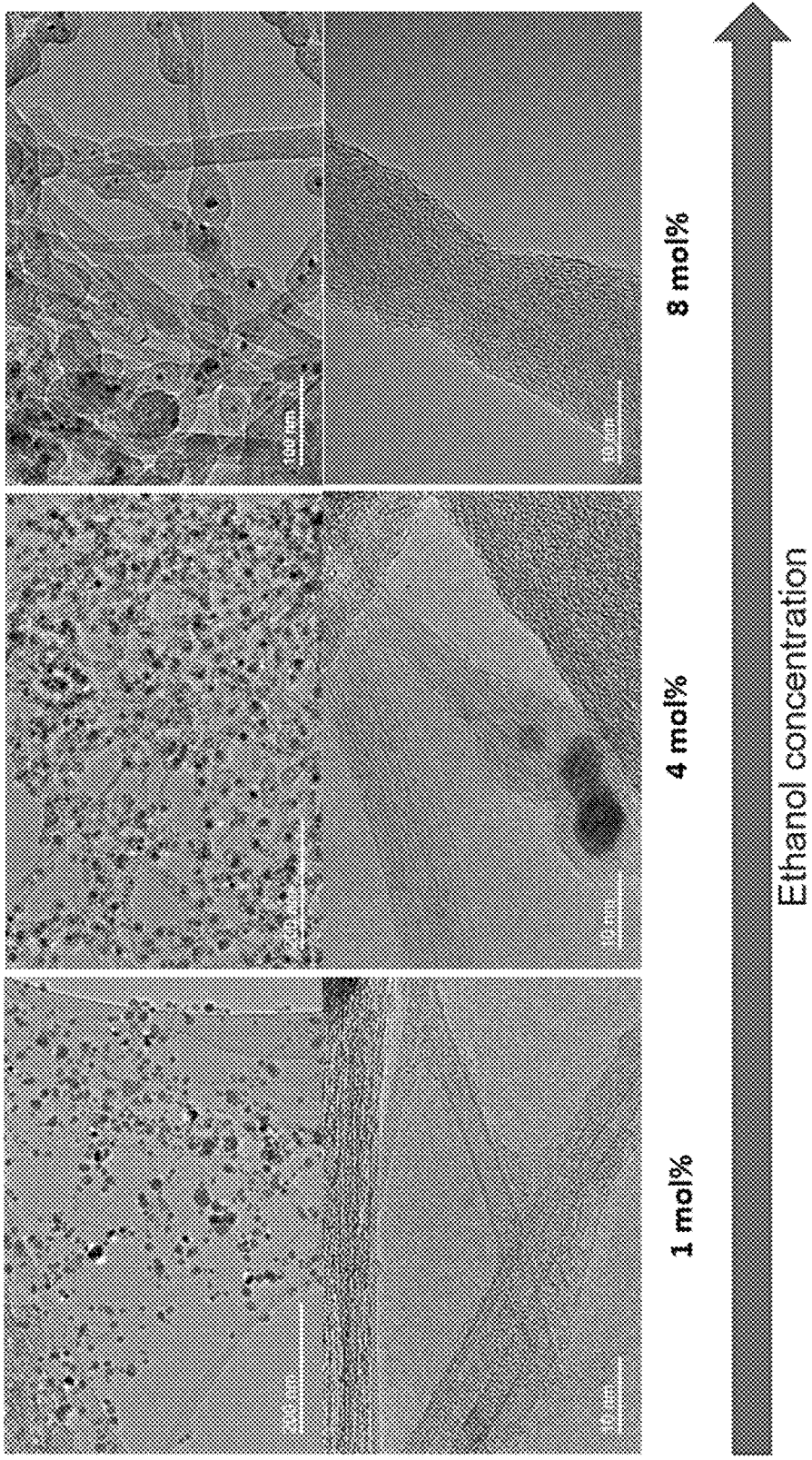
FIG. 22 shows the results of an ethanol concentration experiment.

The results are illustrated in FIG. 22. When increasing the ethanol concentration alone, the formation of amorphous carbon on CNTs becomes overwhelming and decreases the quality of the product. Thus, in some embodiments, the ethanol concentration in the vaporized reactant stream may be 1 to 3 mol %. In some embodiments, the ethanol concentration in the vaporized reactant stream may be 1 to 2 mol %. In some embodiments, the ethanol concentration in the vaporized reactant stream may be about 1 mol %.

Example 5—Toluene Concentration Effect on CNT Production and Spinning

The toluene concentration in the vaporized reactant stream was varied to observe the effect on CNT production rate. Experimental conditions were as follows:

Experimental conditions: Ethanol conc. (2 mol %), Ferrocene conc. (0.042 mol %), Thiophene conc. (0.022 mol %) CEM liquid flow rate: 1.5, N2 flow rate: 1000 sccm, large furnace T: 1250° C. (all three zones), small furnace: 1100° C., nozzle orifice diameter: 0.27"

Figure 23:
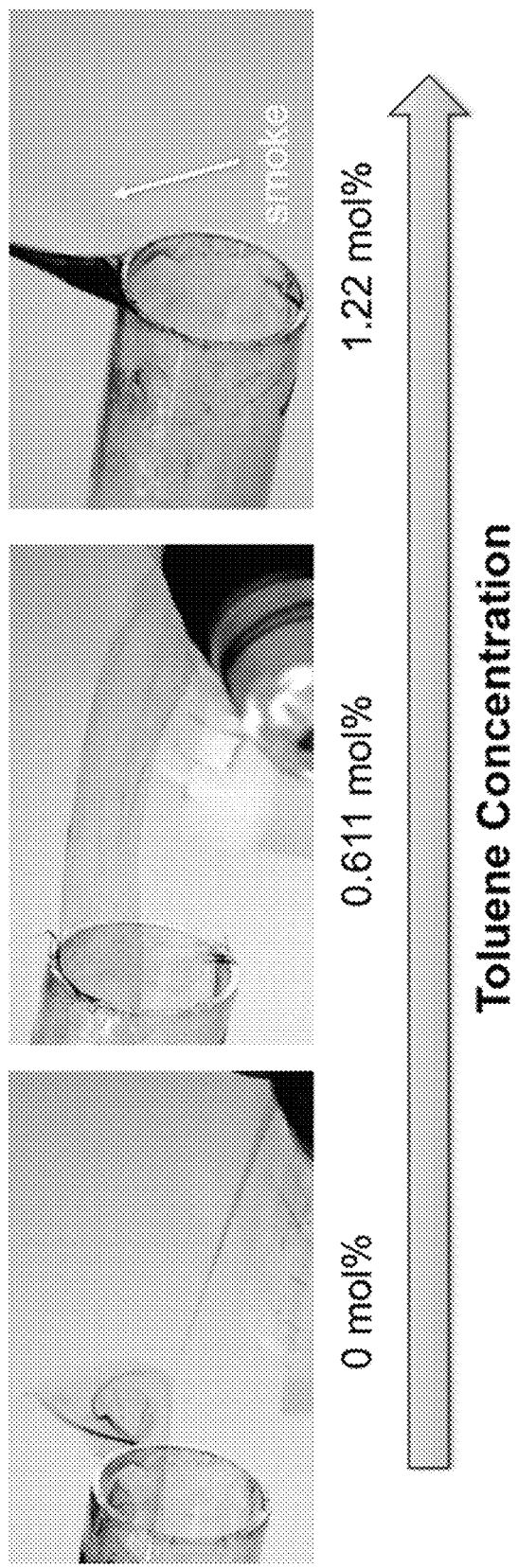
FIG. 23 shows the results of a toluene concentration experiment.

The results are illustrated in FIG. 23. It was observed that without toluene, there is CNT production but it's too little to produce continuous spinning. Additionally, a toluene conc. of 1.22 mol % is excessive and leads to unwanted smoking and little to no CNT production. Therefore, a toluene concentration of 0.611 mol % is sufficient to produce CNT at a high rate for continuous spinning. Accordingly, in some embodiments the toluene concentration in the vaporized reactant stream may be from 0.3 to 0.9 mol %. In some embodiments the toluene concentration in the vaporized reactant stream may be from 0.4 to 0.7 mol %. In some embodiments the toluene concentration in the vaporized reactant stream may be about 0.6 mol %.

Example 6—Preferred Conditions for Synthesizing DWNTs

It has been found that the conditions in Table 2, below, are useful for preferentially producing DWNTs

TABLE 2

| Parameter | Value |
|---|---|
| Toluene (mol %) | 0.967% |
| Ethanol (mol %) | — |
| Ferrocene (mol %) | 0.075% |
| Thiophene (mol %) | 0.038% |
| Methanol (mol %) | >98% |
| Syringe pump/spray nozzle deliver rate (ml/min) | 2 |
| CEM liquid deliver rate (ml/min) | 0.2 |
| N2 gas flow rate (sccm) | 1000 |
| Graphite nozzle orifice diameter | Not used |
| Large Oven Temperature | 1250° C. |
| Small oven Temperature | 1100° C. |

Toluene in methanol solution was introduced via syringe pump/spray nozzle. Ferrocene & thiophene in methanol solution was introduced through the 1EM system.

Example—Preferred Conditions for Synthesizing SWNTs

It has been found that the conditions in Table 3, below, are useful for preferentially producing SWNTs

TABLE 3

| Parameter | Value |
|---|---|
| Toluene (mol %) | 0.777% |
| Ethanol (mol %) | 2.019% |
| Ferrocene (mol %) | 0.042% |
| Thiophene (mol %) | 0.022% |
| Methanol (mol %) | 97.1% |
| Syringe pump/spray nozzle deliver rate (ml/min) | Not used |
| CEM liquid deliver rate (ml/min) | 1.0 |
| N2 gas flow rate (sccm) | 1000 |
| Graphite nozzle orifice diameter | 0.3" |
| Large Oven Temperature | 1250° C. |
| Small oven Temperature | 1100° C. |

All the chemicals were mixed into a single solution which was introduced through the CEM system.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure and claimed subject matter. Thus, it should be understood that although the present disclosure describes preferred embodiments, exemplary embodiments and optional features, modification and variation of the concepts herein disclosed may be resorted to by those skilled in the art, and that such modifications and variations are considered to be within the scope of this disclosure as defined by the appended claims. The specific embodiments provided herein are examples of useful embodiments of the present disclosure and it will be apparent to one skilled in the art that the present disclosure may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of skill in the art can name the same compounds differently.

Certain molecules disclosed herein may contain one or more ionizable groups [groups from which a proton can be removed (e.g., —COOH) or added (e.g., amines) or which can be quaternized (e.g., amines). All possible ionic forms of such molecules and salts thereof are intended to be included individually in the disclosure herein. With regard to salts of the compounds herein, one of skill in the art can select from among a wide variety of available counterions those that are appropriate for preparation of salts of this disclosure for a given application. In specific applications, the selection of a given anion or cation for preparation of a salt may result in increased or decreased solubility of that salt.

Every device, system, formulation, combination of components, or method described or exemplified herein can be used to practice the embodiments of this disclosure, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the disclosure pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to the present disclosure/application, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. Embodiments illustratively described herein suitably may be practiced in the absence of any element or elements, limitation or limitations which is not specifically disclosed herein.

One of skill in the art will appreciate that starting materials, biological materials, reagents, synthetic methods, purification methods, analytical methods, assay methods, and biological methods other than those specifically exemplified can be employed in the practice of the embodiments without resort to undue experimentation. All art-known functional equivalents, of any such materials and methods are intended to be included in this disclosure. The terms and expressions which have been employed are used as terms of description and not of limitation, and there is no intention that in the use of such terms and expressions of excluding any equivalents of the features shown and described or portions thereof, but it is recognized that various modifications are possible within the scope of the present disclosure and claimed subject matter. Thus, it should be understood that although examples of the present disclosure have been specifically described using preferred embodiments and optional features, modification and variation of the concepts herein disclosed may be resorted to by those skilled in the art, and that such modifications and variations are considered to be within the scope of this disclosure as defined by the appended claims.

We claim:

1. A method of producing a carbon nanotube product, the method comprising:
   heating a convergent flow nozzle and a flow chamber of a carbon nanotube reactor, the carbon nanotube reactor having a heated flow chamber disposed downstream of the heated convergent flow nozzle;
   flowing a vaporized reactant stream through the nozzle, the vaporized reactant stream comprising:
      a carbon nanotube nucleation carbon source;
      a carbon nanotube growth carbon source; and
      a carbon nanotube catalyst precursor;
   collecting a carbon nanotube product from an outlet of the heated flow chamber;
wherein the nozzle has a nozzle contraction ratio of from 3:1 to 300:1 and wherein the vaporized reactant stream comprises methanol and an alkyl alcohol having 2-6 carbon atoms or a mixture thereof in a ratio of 7:1 to 200:1 methanol:alkyl alcohol.

2. The method of claim 1, wherein the carbon nanotube product comprises at least 98 at. % carbon.

3. The method of claim 1, wherein the carbon nanotube product comprises less than 1.5 at. % amorphous carbon and/or metal.

4. The method of claim 1 comprising forming catalyst particles from the catalyst precursor in the carbon nanotube reactor and wherein at least 98% of the catalyst particles exiting the reactor have a mean diameter of not greater than 16 nm.

5. The method of claim 4, wherein the median diameter of catalyst particles exiting the reactor is from 4 to 8 nm.

6. The method of claim 1, wherein the catalyst precursor comprises iron.

7. The method of claim 1, wherein the catalyst precursor comprises ferrocene and/or nickelocene.

8. The method of claim 1, wherein the catalyst precursor comprises nickelocene and ferrocene in a ratio of 1:1000 to 1:20 nickelocene:ferrocene by weight.

9. The method of claim 6, wherein the ratio of C to Fe in the vaporized reactant mixture is from 80 to 500.

10. The method of claim 1, wherein the ratio of carbon atoms of the nanotube nucleation carbon source to carbon atoms of the nanotube growth carbon source in the vaporized reactant mixture is from 1:5 to 5:1.

11. The method of claim 1, wherein the nanotube nucleation carbon source comprises an aromatic hydrocarbon or a heteroaromatic compound.

12. The method of claim 1, wherein the nanotube nucleation carbon source is selected from the group consisting of: toluene, benzene, pyridine, acetylene, ethylene, and combinations thereof.

13. The method of claim 1, wherein the nanotube nucleation carbon source comprises toluene.

14. The method of claim 1, wherein the nanotube growth carbon source comprises ethanol.

15. The method of claim 1, wherein the vaporized reactant stream comprises methanol and ethanol in a ratio of 10:1 to 100:1 methanol:ethanol.

16. The method of claim 1 comprising heating the nozzle to a temperature of 500° C. to 1100° C.

17. The method of claim 1 comprising heating the flow chamber to a temperature of 900° C. to 1250° C.

18. The method of claim 1 wherein the vaporized reactant stream is carried into the nozzle and through the heated flow chamber by a non-reactive carrier gas.

19. The method of claim 18, wherein the non-reactive carrier gas is nitrogen, helium, neon, argon, krypton, xenon, radon, and/or combinations thereof.

20. The method of claim 1, wherein the ratio of methanol:—alkyl alcohol is 10:1-100:1.

21. The method of claim 1, wherein the alkyl alcohol is ethanol.

22. A method of producing a carbon nanotube product, the method comprising:
heating a convergent flow nozzle and a flow chamber of a carbon nanotube reactor, the carbon nanotube reactor having a heated flow chamber disposed downstream of the heated convergent flow nozzle;
flowing a vaporized reactant stream through the nozzle; and
collecting a carbon nanotube product from an outlet of the heated flow chamber, wherein the nozzle has a nozzle contraction ratio of from 3:1 to 300:1; and
wherein the vaporized reactant stream comprises:
93 to 98 wt. % methanol;
0.1 to 3 wt. % ethanol;
0.4 to 0.45 wt. % ferrocene;
0.05 to 0.1 wt. % thiophene; and
2.5 to 2.8 wt. % toluene.

\* \* \* \* \*